(12) United States Patent
Drake

(10) Patent No.: US 10,268,930 B2
(45) Date of Patent: Apr. 23, 2019

(54) IMAGE PROCESSING SYSTEM AND METHOD FOR IDENTIFYING CONTENT WITHIN IMAGE DATA USING MARKOV RANDOM FIELDS

(71) Applicant: CANON KABUSHIKI KAISHA, Tokyo (JP)

(72) Inventor: Barry James Drake, Thornleigh (AU)

(73) Assignee: Canon Kabushiki Kaisha, Tokyo (JP)

(*) Notice: Subject to any disclaimer, the term of this patent is extended or adjusted under 35 U.S.C. 154(b) by 12 days.

(21) Appl. No.: 15/214,971

(22) Filed: Jul. 20, 2016

(65) Prior Publication Data
US 2017/0024635 A1 Jan. 26, 2017

(30) Foreign Application Priority Data

Jul. 22, 2015 (AU) .................................. 2015205874

(51) Int. Cl.
*G06K 9/62* (2006.01)

(52) U.S. Cl.
CPC ......... *G06K 9/6297* (2013.01); *G06K 9/6262* (2013.01)

(58) Field of Classification Search
CPC ........................... G06K 9/6297; G06K 9/6262
See application file for complete search history.

(56) References Cited

U.S. PATENT DOCUMENTS

| | | | |
|---|---|---|---|
| 6,744,923 B1 | 6/2004 | Zabih et al. | |
| 7,672,516 B2 | 3/2010 | Cremers et al. | |
| 8,041,114 B2 | 10/2011 | Rother et al. | |
| 8,160,993 B2 | 4/2012 | Chu et al. | |
| 8,218,859 B2 | 7/2012 | Wang et al. | |
| 8,249,349 B2 | 8/2012 | Blake et al. | |
| 8,275,075 B2 | 9/2012 | Luo | |
| 8,352,384 B2 | 1/2013 | Mansinghka et al. | |
| 8,645,286 B2 | 2/2014 | Jonas et al. | |
| 8,676,722 B2 | 3/2014 | Sweeney et al. | |
| 2003/0192021 A1 | 10/2003 | Teig et al. | |

OTHER PUBLICATIONS

Sun, Min, et al. "Efficient and exact MAP-MRF inference using branch and bound." Artificial Intelligence and Statistics. 2012 (Year: 2012).*

(Continued)

*Primary Examiner* — Menatoallah Youssef
(74) *Attorney, Agent, or Firm* — Canon USA Inc., IP Division

(57) ABSTRACT

An image processing system for identifying content within image data. The image processing system comprises a processor that is arranged to: arrange image data in a Markov random field (MRF); and calculate state upper bound values of pairs of variables in the image data that are associated with an edge. The calculation of the state upper bound values is performed by the processor assigning the maximum state values of all of the states of a first variable of the pair of variables to the states of a second variable of the pair of variables, identifying the first and second variables from the pair of variables based on a number of states within each of the first and second variables, and determining a single state solution for identifying content in the image data based on the calculation of the state upper bound values.

20 Claims, 13 Drawing Sheets

(56) References Cited

OTHER PUBLICATIONS

Sun, Min, et al. "An efficient branch-and-bound algorithm for optimal human pose estimation." Computer Vision and Pattern Recognition (CVPR), 2012 IEEE Conference on. IEEE, 2012. (Year: 2012).*
Min Sun, Murali Telaprolu, Honglak Lee, Silvio Savarese. Efficient and Exact MAP-MRF Inference using Branch and Bound. In AISTATS 2012, Proceedings from Artificial Intelligence and Statistics, La Palma, Canary Islands, Apr. 2012; Journal of Machine Learning Research, Workshop and Conference Proceedings: 2012.
Caldwell, Kahng and Markov. Optimal Partitioners and End-Case Placers for Standard-Cell Layout. In Proceedings of the ACM International Symposium on Physical Design, Apr. 1999, pp. 90-96.
Lempitsky, Blake, and Rother. Image segmentation by branch-and-mincut. In Computer Vision, ECCV 2008, Oct. 12-18, Marseille-France; Springer: 2008; pp. 15-29.
Wang, Zhao, Wu, and Hua. Transductive multi-label learning for video concept detection. In Proceedings of the 1st ACM International Conference on Multimedia Information Retrieval. MIR 2008 pp. 298-304.

* cited by examiner

| | $X_1$ | $X_2$ | $X_3$ | $X_4$ | $X_5$ | f(x) |
|---|---|---|---|---|---|---|
| | 0 | 0 | 0 | 0 | 0 | 0.234 |
| | 1 | 0 | 0 | 0 | 0 | 0.326 |
| | 2 | 0 | 0 | 0 | 0 | 0.143 |
| | ... | ... | ... | ... | ... | ... |
| | 0 | 3 | 1 | 2 | 4 | 3.213 |
| | ... | ... | ... | ... | ... | ... |
| | 3 | 3 | 3 | 2 | 5 | 1.234 |

Fig. 6

IMAGE PROCESSING SYSTEM AND METHOD FOR IDENTIFYING CONTENT WITHIN IMAGE DATA USING MARKOV RANDOM FIELDS

REFERENCE TO RELATED PATENT APPLICATION(S)

This application claims the benefit under 35 U.S.C. § 119 of the filing date of Australian Patent Application No. 2015205874, filed Jul. 22, 2015, hereby incorporated by reference in its entirety as if fully set forth herein.

TECHNICAL FIELD

The present invention relates generally to an image processing system and method for identifying content within image data. In particular, the present invention relates to the use of Markov random fields to identify content within image data.

BACKGROUND

When multiple images or sequences of images have or are being captured using camera or video equipment, it may be desirable to monitor those images to determine their content.

For example, a search may be desired to locate a particular image within a collection of images. The search criteria may be for one or more of a particular person, event, object, action etc., or any combination thereof. However, a vast amount of images are being collected on a regular basis day by day and so the search time for searching libraries of images and/or the computing power required to perform the search may be prohibitive.

As a further example, it may be desirable to monitor the images of a surveillance system to determine whether the images contain particular content therein. The search criteria in this example may also include one or more of a particular person, event, object, action etc., or any combination thereof.

A Markov random field (MRF) is a probabilistic model that models interactions among states of a system. An MRF determines a value for each possible MRF state of the system as a function of so-called total potential functions; the values collectively define a probability distribution over all possible states of the system. With the capability of exploiting the state inter-dependencies, MRFs have been shown to have wide applicability across different fields including robotics, molecular biology, image processing, and computer vision in order to assist in finding states that most closely relate to a defined search criteria.

Finding a maximum a posteriori (MAP) state of an MRF is a key inference problem which aims to find a most probable state of the system (the so called MAP-MRF problem). Solving a MAP-MRF is equivalent to finding the state with an optimal total potential. A MAP state of an MRF is also known as a MAP solution.

Finding a MAP solution to an arbitrary MRF is known to be NP-hard, that is, no algorithm can guarantee performance better than exhaustively testing all possible states. Nevertheless, MRFs are useful for modelling complex systems because there are efficient algorithms that (i) find approximate solutions, (ii) solve restricted classes of MRFs such as MRFs with potential functions admitting sub-modularity condition, or MRFs with acyclic dependencies among pairs of random variables, and (iii) find an exact or near exact MAP solution while avoiding the worst case performance for real-world models.

Exact or near-exact MAP solutions for densely connected MRFs are highly desirable in some problem domains such as those in computer vision where fast processing of images and videos is needed.

One approach for solving a MAP-MRF problem is based on a general branch-and-bound method. In a general branch-and-bound method, an original state space is split into smaller and disjoint parts of the original state space; the split being based on an upper bound estimate of each part, called a part upper bound of that part. The tightness and computation time of a part upper bound is important for a branch-and-bound method to quickly find a MAP solution. One approach for producing a part upper bound is to use a linear programming method. However, linear programming methods are expensive and may only be optimal for the first split; subsequent splits would require either reapplying a linear programming method or being content with a less effective part upper bound.

Another approach for producing a part upper bound is to statically compute a part upper bound without exploiting the structure of the parts. Such a method leads to poor part upper bounds, which prevents the method from quickly finding a MAP solution.

Another method for solving an MAP-MRF problem is to use belief propagation based on linear programming relaxation and dual optimisation in order to iteratively find a near or exact MAP solution. This method may be useful when finding a MAP solution for a sparse MRF where there may not be many inter-dependencies among variables of the MRF. However this method is slow and inefficient for cyclic or densely connected MRFs.

Hence, there exists a need to efficiently find exact MAP solutions for densely connected MRFs, which are particularly important in the field of pattern recognition.

SUMMARY

Disclosed are arrangements which seek to address the above problems by providing a method any system for identifying content in image data Two efficient MAP-MRF solvers are described. Each is capable of finding an exact MAP solution for an arbitrary MRF where the MRF has discrete states and pairwise interactions among possible states of the variables. Each solver is based on a branch-and-bound method. A method is described for producing a part upper bound, which is tight and fast to compute.

According to a first aspect of the disclosure, there is provided an image processing system for identifying content within image data, the image processing system comprising a processor arranged to: arrange image data in a Markov random field (MRF); calculate state upper bound values of pairs of variables in the image data that are associated with an edge, wherein the calculation is performed by the processor being further arranged to assign maximum state values of all of the states of a first variable of the pair of variables to the states of a second variable of the pair of variables, and identify the first and second variables from the pair of variables based on a number of states within each of the first and second variables, and determine a single state solution for identifying content in the image data based on the calculation of the state upper bound values.

According to a second aspect of the disclosure, there is provided an image processing method for identifying content within image data, the method comprising the steps of: arranging image data in a Markov random field (MRF); calculating state upper bound values of pairs of variables in the image data that are associated with an edge, wherein the calculating step comprises the step of assigning maximum state values of all of the states of a first variable of the pair of variables to the states of a second variable of the pair of variables, and identifying the first and second variables from the pair of variables based on a number of states within each of the first and second variables, and determining a single state solution for identifying content in the image data based on the calculation of the state upper bound values.

According to a third aspect of the disclosure, there is provided a method of solving a MRF, the MRF having a plurality of binary potential functions, each binary potential function associated with two variables of the MRF, the method comprising the steps of: selecting a first variable of the two variables, the first variable having more states than a second variable of the two variables, wherein each of the two variables has a plurality of states; for each state of the selected first variable, adding to an upper limit of the state, a maximum of a binary potential function that includes the state and the second variable, wherein the binary potential function is between a function of the first and second variables of the MRF; assigning to an upper limit of the first variable a maximum of the upper limit of the states of the first variable; and locating a solution to the MRF in a part of a solution space of the MRF using the upper limit of the first variable.

According to a fourth aspect of the disclosure, there is provided an image processing system for solving a MRF, the MRF having a plurality of binary potential functions, each binary potential function associated with two variables of the MRF, the system comprising a processor arranged to: select a first variable of the two variables, the first variable having more states than a second variable of the two variables, wherein each of the two variables has a plurality of states; for each state of the selected first variable, add to an upper limit of the state, a maximum of a binary potential function that includes the state and the second variable, wherein the binary potential function is between a function of the first and second variables of the MRF; assign to an upper limit of the first variable a maximum of the upper limit of the states of the first variable; and locate a solution to the MRF in a part of a solution space of the MRF using the upper limit of the first variable.

Other aspects are also disclosed.

BRIEF DESCRIPTION OF THE DRAWINGS

One or more embodiments of the invention will now be described with reference to the following drawings, in which:

FIG. 6 shows a tabular representation of a state space of an MRF according to the present disclosure;

DETAILED DESCRIPTION INCLUDING BEST MODE

Figure 1A:
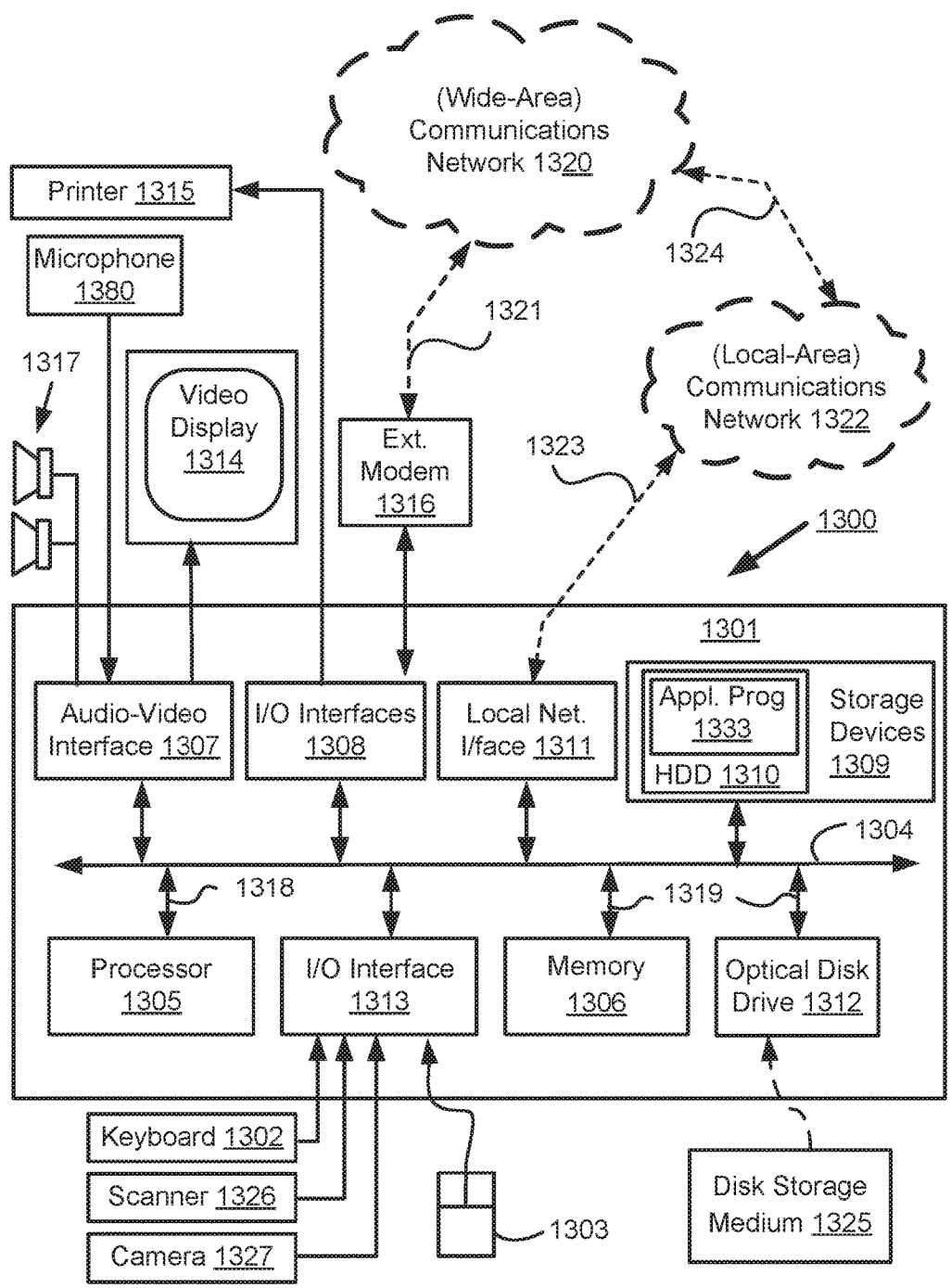
FIGS. 1A and 1B form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Figure 1B:
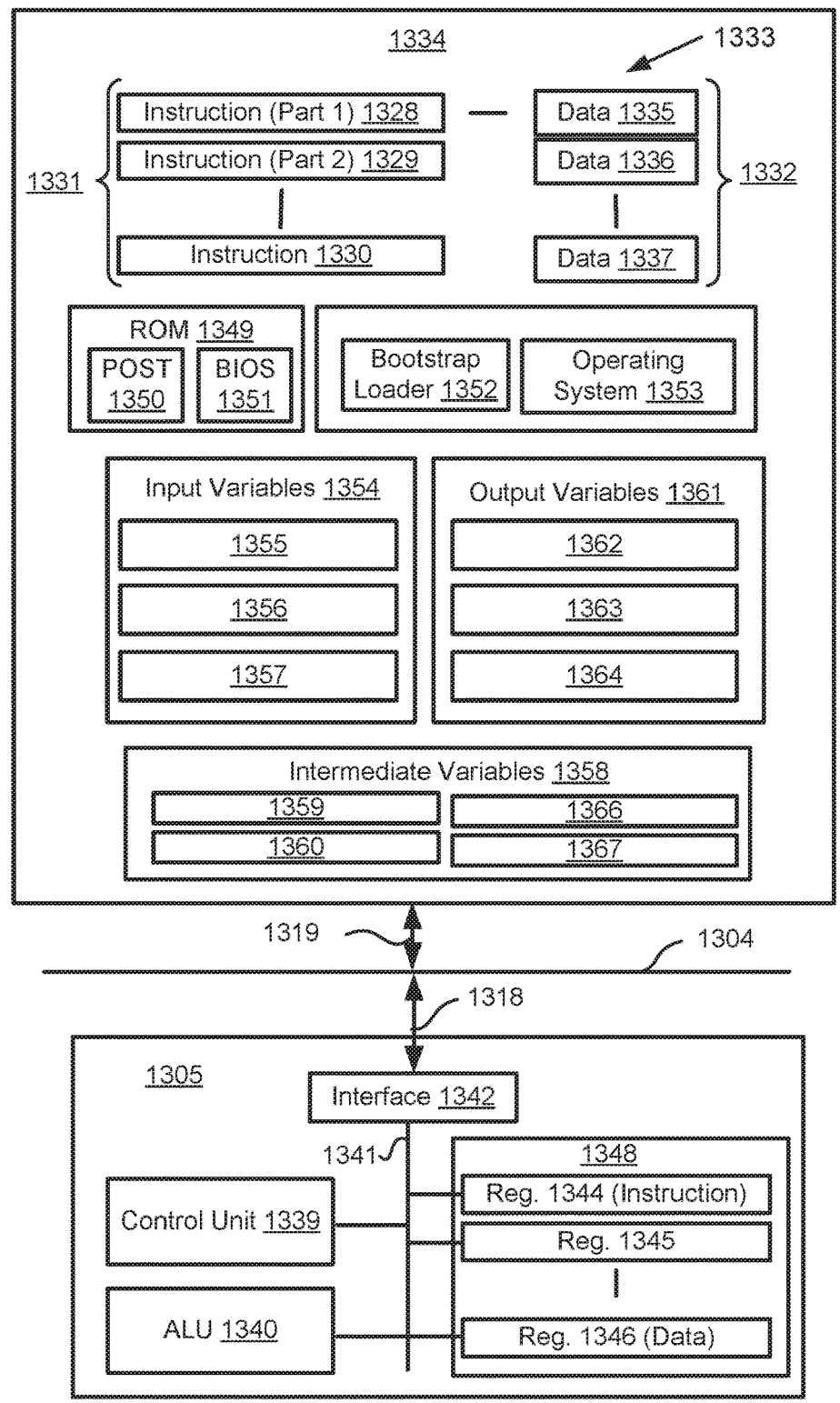

FIGS. 1A and 1B depict a general-purpose computer system 1300, upon which the various arrangements described can be practiced.

As seen in FIG. 1A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 1A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or a like computer systems.

The method of identifying content within image data may be implemented using the computer system 1300 wherein the processes of FIG. 7A, 8A, 8B or 9, to be described, may be implemented as one or more software application programs 1333 executable within the computer system 1300. In particular, the steps of the method of identifying content within image data are effected by instructions 1331 (see FIG. 1B) in the software 1333 that are carried out within the computer system 1300. The software instructions 1331 may be formed as one or more code modules, each for performing one or more particular tasks. The software may also be divided into two separate parts, in which a first part and the corresponding code modules performs the herein described methods and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for identifying content within image data.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for identifying content within image data.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 1B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 1A.

When the computer module 1301 is initially powered up, a power-on self-test (POST) program 1350 executes. The POST program 1350 is typically stored in a ROM 1349 of the semiconductor memory 1306 of FIG. 1A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 1A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 1A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 1B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 1A. The execution of a set of the instructions may in some cases result in output of data. Execution may also involve storing data or variables to the memory 1334.

The disclosed content identification arrangements use input variables 1354, which are stored in the memory 1334 in corresponding memory locations 1355, 1356, 1357. The content identification arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 1B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

a fetch operation, which fetches or reads an instruction 1331 from a memory location 1328, 1329, 1330;

a decode operation in which the control unit 1339 determines which instruction has been fetched; and an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIG. 7A, 8A, 8B or 9 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The method of identifying content within image data may alternatively be implemented in dedicated hardware such as one or more integrated circuits performing the functions or sub functions of identifying content within image data. Such dedicated hardware may include graphic processors, digital signal processors, or one or more microprocessors and associated memories.

Figure 2A:
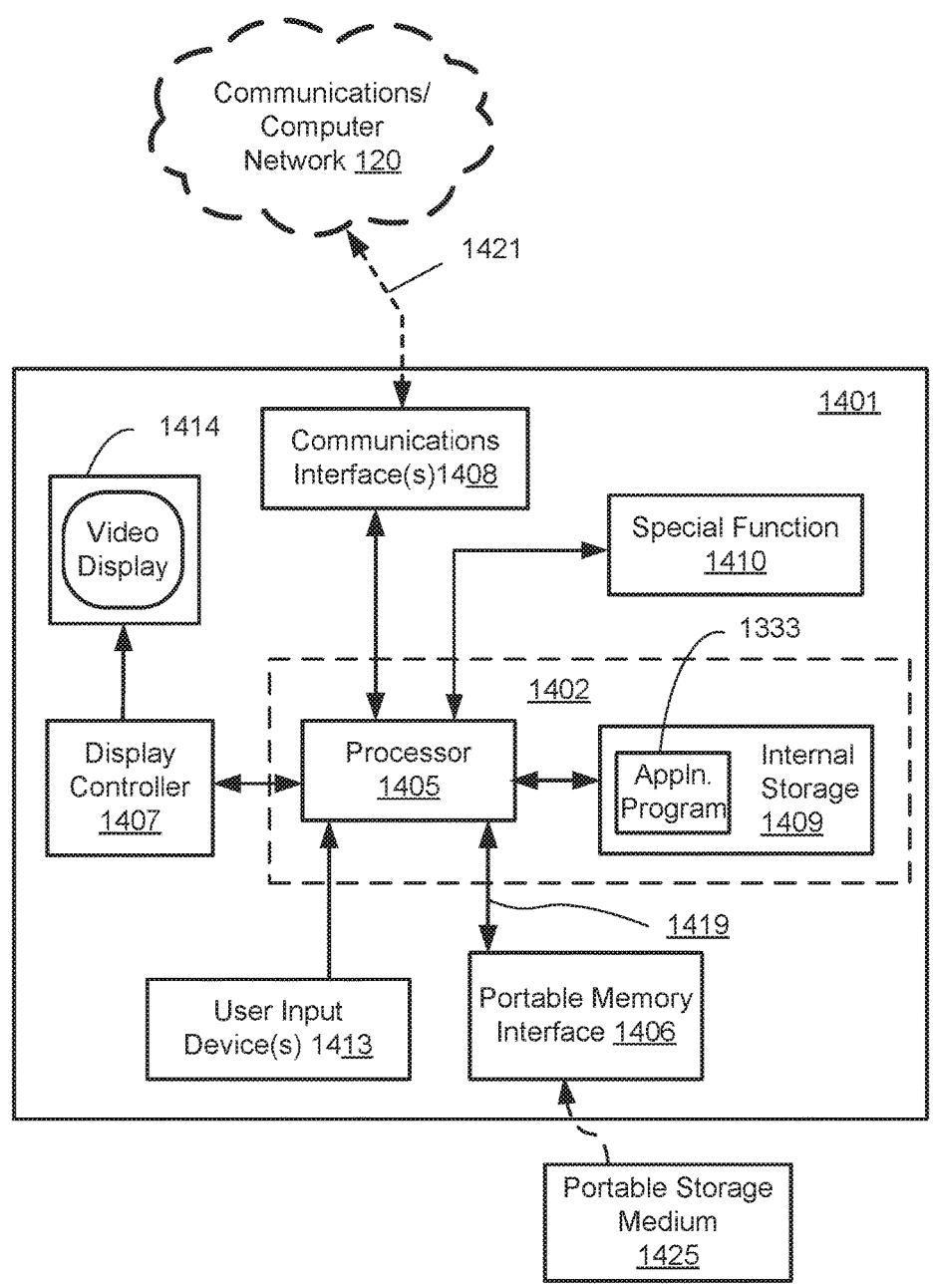
FIGS. 2A and 2B collectively form a schematic block diagram representation of an electronic device upon which described arrangements can be practised.
Figure 2B:
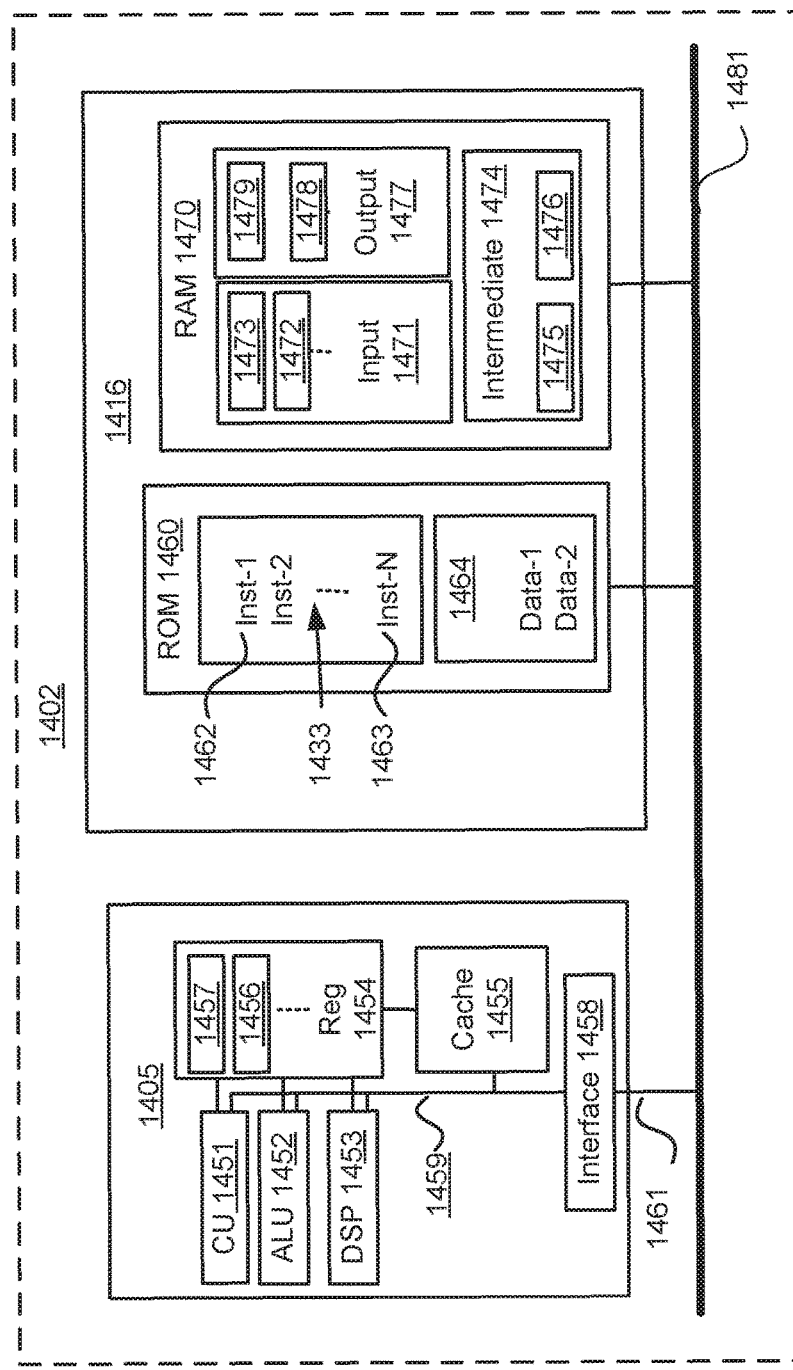

FIGS. 2A and 2B collectively form a schematic block diagram of a general purpose electronic device 1401 including embedded components, upon which the image processing methods, or parts thereof, to be described are desirably practiced. The electronic device 1401 may be, for example, a mobile phone, a portable media player or a digital camera, in which processing resources are limited. Nevertheless, the methods, or parts thereof, to be described may also be performed on higher-level devices (such as that shown in FIGS. 1A and 1B) such as desktop computers, server computers, and other such devices with significantly larger processing resources.

As seen in FIG. 2A, the electronic device 1401 comprises an embedded controller 1402. Accordingly, the electronic device 1401 may be referred to as an "embedded device." In the present example, the controller 1402 has a processing unit (or processor) 1405 which is bi-directionally coupled to an internal storage module 1409. The storage module 1409 may be formed from non-volatile semiconductor read only memory (ROM) 1460 and semiconductor random access memory (RAM) 1470, as seen in FIG. 2B. The RAM 1470 may be volatile, non-volatile or a combination of volatile and non-volatile memory.

The electronic device 1401 includes a display controller 1407, which is connected to a video display 1414, such as a liquid crystal display (LCD) panel or the like. The display controller 1407 is configured for displaying graphical images on the video display 1414 in accordance with instructions received from the embedded controller 1402, to which the display controller 1407 is connected.

The electronic device 1401 also includes user input devices 1413 which are typically formed by keys, a keypad or like controls. In some implementations, the user input devices 1413 may include a touch sensitive panel physically associated with the display 1414 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the electronic device 1401 also comprises a portable memory interface 1406, which is coupled to the processor 1405 via a connection 1419. The portable memory interface 1406 allows a complementary portable memory device 1425 to be coupled to the electronic device 1401 to act as a source or destination of data or to supplement the internal storage module 1409. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1401 also has a communications interface 1408 to permit coupling of the device 1401 to a computer or communications network 1420 via a connection 1421. The connection 1421 may be wired or wireless. For example, the connection 1421 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 1401 is configured to perform some special function. The embedded controller 1402, possibly in conjunction with further special function components 1410, is provided to perform that special function. For example, where the device 1401 is a digital camera, the components 1410 may represent a lens, focus control and image sensor of the camera. The special function components 1410 is connected to the embedded controller 1402. As another example, the device 1401 may be a mobile telephone handset. In this instance, the components 1410 may represent those components required for communications in a cellular telephone environment. Where the device 1401 is a portable device, the special function components 1410 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 1402, where the processes or one or more sub-processes of FIG. 7A, 8A, 8B or 9 may be implemented as one or more software application programs 1433 executable within the embedded controller 1402. The electronic device 1401 of FIG. 2A implements the described methods. In particular, with reference to FIG. 2B, the steps of the described methods are effected by instructions in the software 1433 that are carried out within the controller 1402. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1433 of the embedded controller 1402 is typically stored in the non-volatile ROM 1460 of the internal storage module 1409. The software 1433 stored in the ROM 1460 can be updated when required from a computer readable medium. The software 1433 can be loaded into and executed by the processor 1405. In some instances, the processor 1405 may execute software instructions that are located in RAM 1470. Software instructions may be loaded into the RAM 1470 by the processor 1405 initiating a copy of one or more code modules from ROM 1460 into RAM 1470. Alternatively, the software instructions of one or more code modules may be pre-installed in a non-volatile region of RAM 1470 by a manufacturer. After one or more code modules have been located in RAM 1470, the processor 1405 may execute software instructions of the one or more code modules.

The application program 1433 is typically pre-installed and stored in the ROM 1460 by a manufacturer, prior to distribution of the electronic device 1401. However, in some instances, the application programs 1433 may be supplied to the user encoded on one or more CD-ROM (not shown) and read via the portable memory interface 1406 of FIG. 2A prior to storage in the internal storage module 1409 or in the portable memory 1425. In another alternative, the software application program 1433 may be read by the processor 1405 from the network 1420, or loaded into the controller 1402 or the portable storage medium 1425 from other computer readable media. Computer readable storage media refers to any non-transitory tangible storage medium that participates in providing instructions and/or data to the controller 1402 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1401. Examples of transitory or non-tangible computer readable transmission media that may also participate in the provision of software, application programs, instructions and/or data to the device 1401 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1433 and the corresponding code modules mentioned above may be executed to implement one or more graphical user interfaces (GUIs) to be rendered or otherwise represented upon the display 1414 of FIG. 2A. Through manipulation of the user input device 1413 (e.g., the keypad), a user of the device 1401 and the application programs 1433 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 1402 having the processor 1405 for executing the application programs 1433 and the internal storage 1409. The internal storage 1409 comprises read only memory (ROM) 1460 and random access memory (RAM) 1470. The processor 1405 is able to execute the application programs 1433 stored in one or both of the connected memories 1460 and 1470. When the electronic device 1401 is initially powered up, a system program resident in the ROM 1460 is executed. The application program 1433 permanently stored in the ROM 1460 is sometimes referred to as "firmware". Execution of the firmware by the processor 1405 may fulfil various functions, including processor management, memory management, device management, storage management and user interface.

The processor 1405 typically includes a number of functional modules including a control unit (CU) 1451, an arithmetic logic unit (ALU) 1452, a digital signal processor (DSP) 14153 and a local or internal memory comprising a set of registers 1454 which typically contain atomic data elements 1456, 1457, along with internal buffer or cache memory 1455. One or more internal buses 1459 interconnect these functional modules. The processor 1405 typically also has one or more interfaces 1458 for communicating with external devices via system bus 1481, using a connection 1461.

The application program 1433 includes a sequence of instructions 1462 through 1463 that may include conditional branch and loop instructions. The program 1433 may also include data, which is used in execution of the program 1433. This data may be stored as part of the instruction or in a separate location 1464 within the ROM 1460 or RAM 1470.

In general, the processor 1405 is given a set of instructions, which are executed therein. This set of instructions may be organised into blocks, which perform specific tasks or handle specific events that occur in the electronic device 1401. Typically, the application program 1433 waits for events and subsequently executes the block of code associated with that event. Events may be triggered in response to input from a user, via the user input devices 1413 of FIG. 2A, as detected by the processor 1405. Events may also be triggered in response to other sensors and interfaces in the electronic device 1401.

The execution of a set of the instructions may require numeric variables to be read and modified. Such numeric variables are stored in the RAM 1470. The disclosed method uses input variables 1471 that are stored in known locations 1472, 1473 in the memory 1470. The input variables 1471 are processed to produce output variables 1477 that are stored in known locations 1478, 1479 in the memory 1470. Intermediate variables 1474 may be stored in additional memory locations in locations 1475, 1476 of the memory 1470. Alternatively, some intermediate variables may only exist in the registers 1454 of the processor 1405.

The execution of a sequence of instructions is achieved in the processor 1405 by repeated application of a fetch-execute cycle. The control unit 1451 of the processor 1405 maintains a register called the program counter, which contains the address in ROM 1460 or RAM 1470 of the next instruction to be executed. At the start of the fetch execute cycle, the contents of the memory address indexed by the program counter is loaded into the control unit 1451. The instruction thus loaded controls the subsequent operation of the processor 1405, causing for example, data to be loaded from ROM memory 1460 into processor registers 1454, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1433, and is performed by repeated execution of a fetch-execute cycle in the processor 1405 or similar programmatic operation of other independent processor blocks in the electronic device 1401.

The herein described method and system address the identification of content within complex media such as images and/or videos. In images and videos, content may include, for example: (i) the objects of interest and their locations (e.g. people); (ii) the scene category and other global scene characteristics (e.g. the event depicted by the scene); (iii) interactions between identified objects (e.g. actions performed by people). To achieve this, an approach is to model the input media and its content using probabilistic models, and solve the probabilistic models using inferencing.

In general, inferencing on arbitrary probabilistic models is computationally expensive. To reduce computational cost, the herein described system and method initially builds and solves a simple probabilistic model, and then refines the model based on analysing the solution. Such an inference system is shown in general in FIG. 3.

Figure 3:
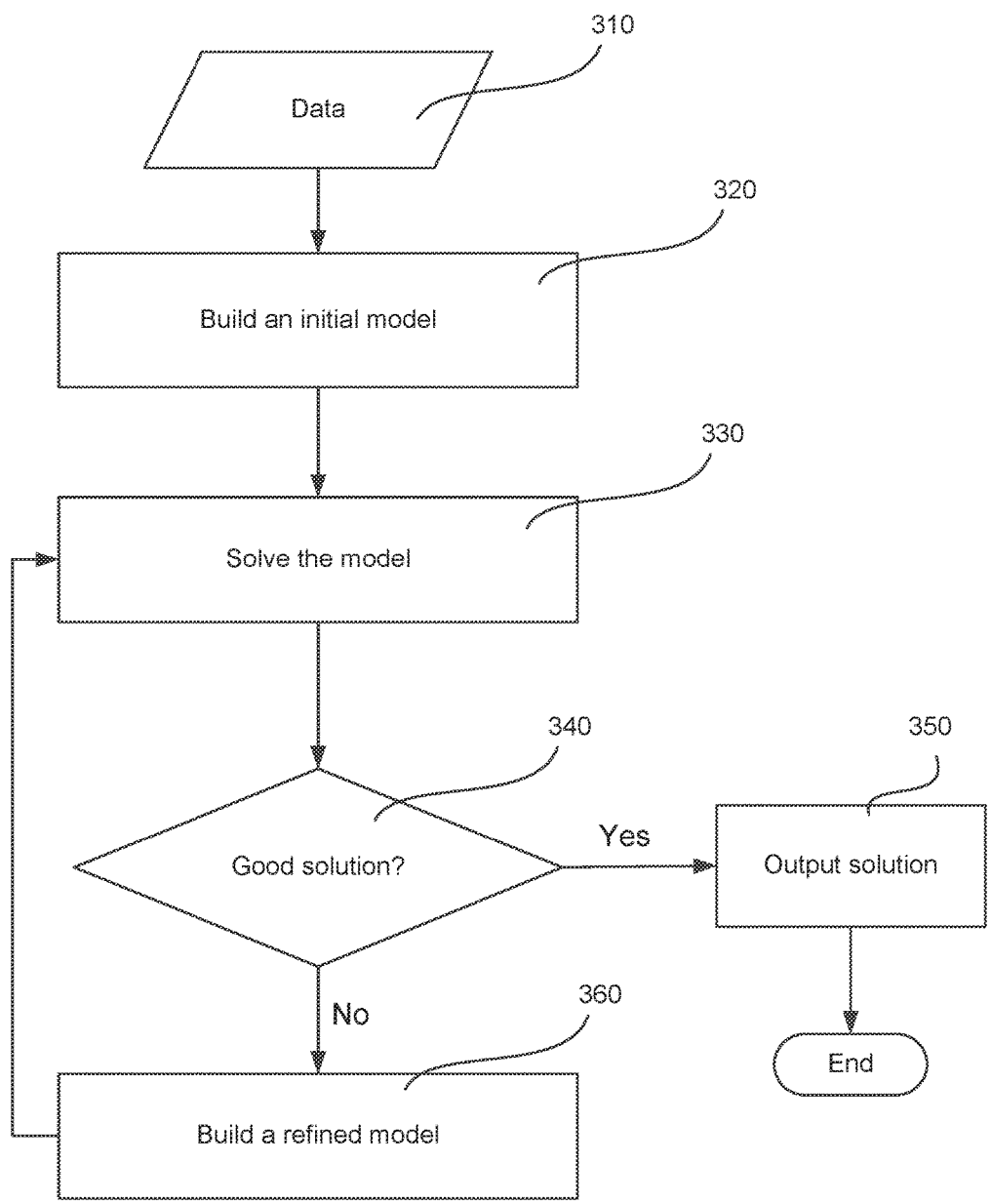
FIG. 3 shows a schematic diagram of an inference system encompassing an image processing system and method according to the present disclosure.

The inference system shown in FIG. 3 works as follows. First, an initial model 320 is built based on given image data 310. In step 330, the model is solved in order to find the most probable state of the system. That is, the image is analysed to determine, for example, who the most likely subject is in the image, what the most likely action is occurring in the image, what the most likely displayed objects there are in the image, etc. Step 330 is described in more detail below with regard to the image processing system and method. The solution is then analysed at 340. Step 340 determines if the solution is good enough by testing the solution against a pre-determined criterion. If 'yes', control goes to step 350, where the solution is returned and the inference procedure terminates. Otherwise, control goes to step 360 to build a refined model. After the model update at step 360, control goes back to step 330. A key part of an inference system is a probabilistic model, and a method to find the most probable state of the system. Markov random fields (MRF) are popular probabilistic models that are used to capture inter-dependencies among semantic concepts in the input media. The described arrangements concern a method or system to efficiently find the most probable state of the system, or specifically of an MRF. The problem of finding the most probable state of an MRF is called Maximum a Posteriori-MRF problem or shortly MAP-MRF problem. Mathematical formulation of an MRF is defined first, followed by description of the MAP-MRF problem.

An MRF is defined by: a set of m random variables $X=\{X_1, X_2, \ldots, X_m\}$; an undirected graph in which each node represents a variable of the MRF and each edge of the undirected graph represents an inter-dependency between two variables incident to the edge; a set of binary potential functions with one binary potential function per edge; and a set of unary potential functions with one unary potential function per random variable. Neither variables nor nodes incident to an edge are considered neighbours of each other. A random variable may also be considered an unknown quantity. An edge may also be considered as a pairwise interaction between two variables. A unary potential function models the occurring potential of the states of a random variable that is associated with the unary potential function. A binary potential function associated with an edge is employed to represent the occurring potential of state pairs of two random variables that are connected by the edge. $H_i$ denotes the set of possible states of variable $X_i$. A unary potential function $f_i$ of variable $X_i$ is defined as a function from the set of possible states $H_i$ of $X_i$ to real values, thus given a state from $H_i$, the function $f_i$ provides a real value. The value $f_i(x_i)$ represents the occurring potential of state $x_i$ of variable $X_i$. A binary potential $f_{i,j}$ between two variables $X_i$ and $X_j$ is defined as a function from the set of combined possible states of the state spaces $H_i$ and $H_j$ of $X_i$ and $X_j$ to real values, thus given a pair of states from $H_i \times H_j$, the function $f_{i,j}$ provides a real value. The value $f_{i,j}(x_i, x_j)$ represents the joint occurring potential of states $x_i$ and $x_j$ of variable $X_i$ and variable $X_j$. Binary potential functions are defined only for a pair of variables that have an edge between them in the undirected graph of the MRF.

It will be understood that there only needs to be one binary potential function per edge, therefore $f_{i,j}(x_i,x_j)$ is equivalent to $f_{j,i}(x_j,x_i)$. If there is more than one binary potential function for a given edge, the binary potential functions may be combined into a single binary potential function associated with the edge. Similarly, it will also be understood that there need only be one unary potential function per variable. If there is no unary potential function for a given variable, a function that returns a constant value may be used without effecting a MAP solution. If there is more than one unary potential function for a given variable, the unary potential functions may be combined into a single unary potential function associated with the variable using any suitable known technique.

The state space H of an MRF is defined as the set product of the state spaces of all variables of the MRF, thus $H=\Pi_i H_i$. A state of the MRF is referred to as a vector x where the vector $x=(x_1, \ldots, x_m)$ and where each co-ordinate $x_i$ of the vector x is a state of variable $X_i$ thus $x_i \in H_i$. The state space size of the MRF, |H|, is the product of the state space sizes of all the variables of the MRF, thus $|H|=\Pi_i |H_i|$ where $|H_i|$ is the number of possible states of variable $X_i$.

Aspects of this disclosure deal with discrete and pairwise MRFs where state spaces are discrete, and no potential function is a function of more than two variables.

For a state $x=(x_1, \ldots, x_m)$ of an MRF, the (MRF) total potential is defined as the sum of all of the unary potentials $f_i(x_i)$ and binary potentials $f_{i,j}(x_i,x_j)$ of the state, which is shown in equation A $$f(x)=\Sigma_i f_i(x_i)+\Sigma_{i<j} f_{i,j}(x_i,x_j), \quad (A)$$

where the sum over the binary potentials only takes into account the binary potentials $f_{i,j}(x_i,x_j)$ in which the first variable index i is smaller than the second variable index j. The function $f$ is called the total potential function of the MRF.

We consider that all unary and binary potential functions of the MRF are in so-called log-linear form. That is, the joint probability distribution of the random variables of the MRF is defined as the exponential of the total potential $f(x)$ of the state normalised by a constant Z $$P(x) = \frac{1}{Z}\exp(f(x)),$$

where the constant Z is the so-called partition function, which is a normalising constant of the probability distribution. The constant Z is expressed as the sum of the exponential of total potential $f(x)$ over all states x in the MRF state space, H, $$Z=\Sigma_{x \in H}\exp(f(x)).$$

It is known in the art that unary and binary potential functions which are not in log-linear form can be easily converted into log-linear form. For example by taking logs of linear potential functions or by negating so-called energy functions. While the following will be described in terms of log-linear form, it is also possible to apply the described arrangements in other forms such as energy function form or as likelihood function form.

Figure 4:
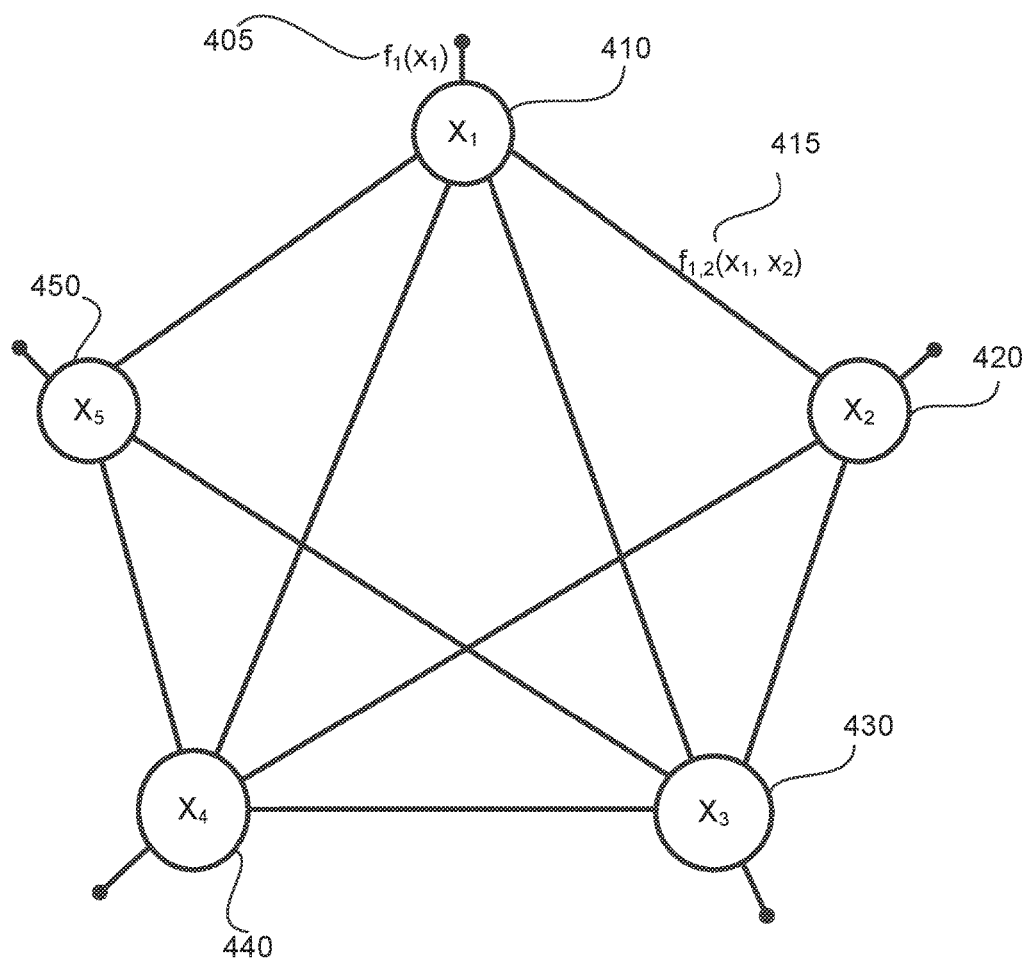
FIG. 4 shows an undirected graph of an example MRF according to the present disclosure.

FIG. 4 shows an example MRF model that can be used as part of the described arrangements to find a MAP solution. The figure shows variables $X_1$ 410, $X_2$ 420, $X_3$ 430, $X_4$ 440, and $X_5$ 450 which are variables of the MRF. The occurring potentials of the variables, and the interactions between variables, are represented as an undirected graph in FIG. 4. Each variable has a set of possible values where each possible value is also known as a state from a set of states. Each variable has a unary edge that represents a unary potential function of the occurring potential of its states. Some pairs of variables have edges between them. Associated with each edge is a binary potential function that represents the occurring potentials of a pair of states of two variables. Variable $X_1$ 410 has unary potential function $f_1(x_1)$ 405 where $x_1$ is a possible state of variable $X_1$. FIG. 4 shows a binary potential function $f_{1,2}(x_1,x_2)$ 415 between two possible states $x_1$ and $x_2$ of variables $X_1$ 410 and $X_2$ 420 respectively. In FIG. 4, there is no edge between variables $X_2$ and $X_5$; that is, there is no binary potential function defined for this pair of variables. Other unary and binary potential functions of the MRF in FIG. 4 are similarly defined.

For example, the MRF represented in FIG. 4 may be used to model the inter-dependencies among the following variables:

Weather represented as $X_1$ with four states of 'sunny', 'windy', 'rainy', and 'cloudy'.

Season represented as $X_2$ with four states of 'summer', 'autumn', 'winter', and 'spring'.

Jenny's location represented as $X_3$ with four states of 'home', 'work', 'golf', and 'party'. states Jenny's health represented as $X_4$ with three states of 'electric', 'tired', and 'ill'.

Day of the week represented as $X_5$ with six possible states of 'Monday', 'Tuesday', 'Wednesday', 'Thursday', 'Friday', and 'Holiday'.

For latter reference, we call this example Jenny's MRF. It is common to encode states of the variables to integers. For example, states of $X_1$, $X_2$, $X_3$, $X_4$ and $X_5$ are respectively encoded to $\{0, 1, 2, 3\}$, $\{0, 1, 2, 3\}$, $\{0, 1, 2, 3\}$, $\{0, 1, 2\}$, and $\{0, 1, 2, 3, 4, 5\}$.

Figure 5:
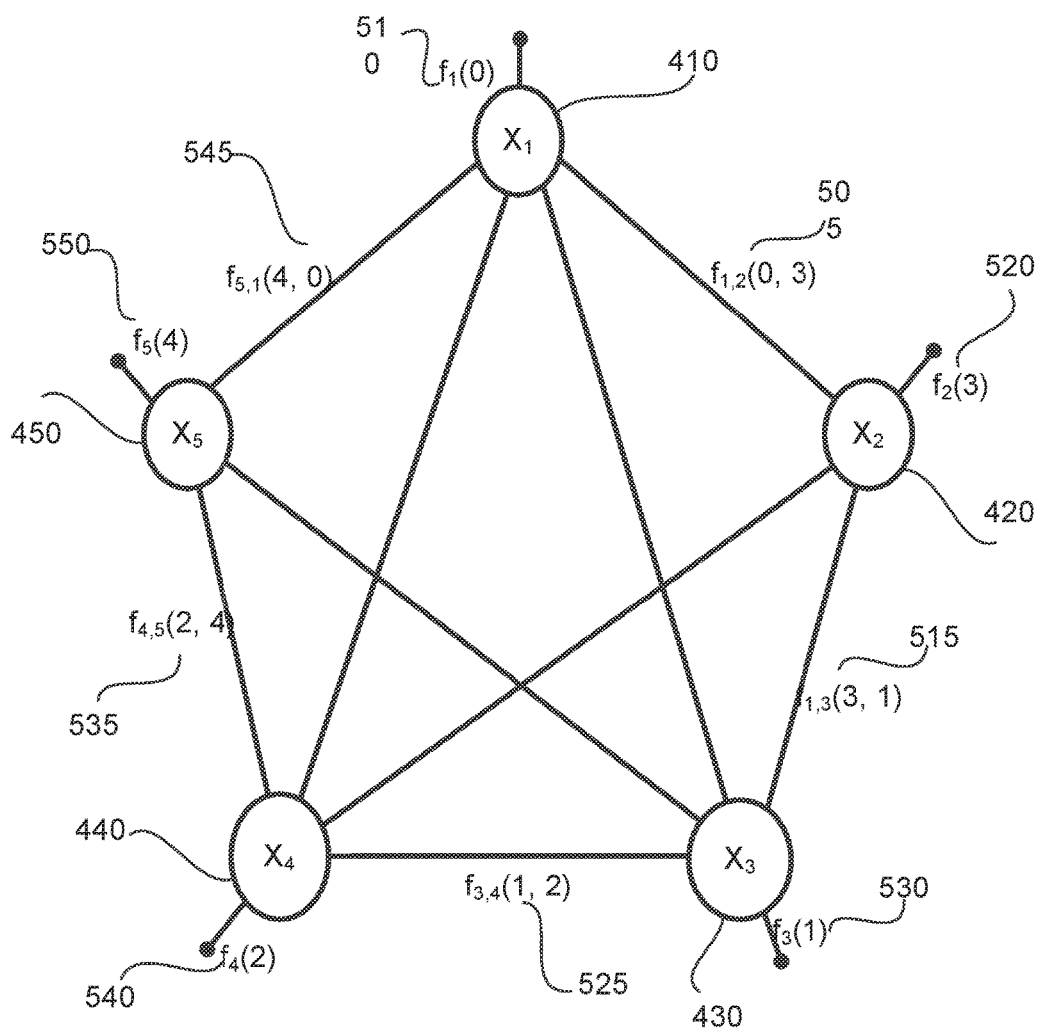
FIG. 5 shows an example state of an MRF according to the present disclosure.

FIG. 5 shows an example state of Jenny's MRF. The state represented in FIG. 5 is $(X_1, X_2, X_3, X_4, X_5)=(0, 3, 1, 2, 4)$, which corresponds to variable $X_1$ 410 being at state 0, variable $X_2$ 420 being at state 3, variable $X_3$ 430 being at state 1, variable $X_4$ 440 being at state 2, variable $X_5$ 450 being at state 4. Unary potentials of the state are respectively shown in FIG. 5 as 510, 520, 530, 540, and 550. Binary potentials between the states of two variables in FIG. 5 are shown as 505, 515, 525, and 535, and 545.

A MAP solution of an MRF is defined as a state $x^*\equiv$MAP-MRF(H,$f$) that maximises the total potential function $f$ over all states in the state space of the MRF; this definition of a MAP solution $x^*$ is specified in the equation B $$x^*=\arg\max_{x \in H} f(x). \quad (B)$$

The problem of finding a MAP solution of an MRF is called a MAP-MRF problem.

FIG. 6 shows an example of the MAP-MRF problem for Jenny's MRF where Jenny's MRF has an undirected graph shown in FIG. 4, and an example state of Jenny's MRF is illustrated in FIG. 5. For each possible state of the MRF, $x=(x_1, x_2, x_3, x_4, x_5)$, the total potential of the state is defined as the sum of unary potentials $f_i(x_i)$ and binary potentials, $f_{i,j}(x_i,x_j)$ for $1 \leq i \leq 5$ and for $1 \leq i < j \leq 5$, which is shown as equation A. The second sum in equation A only considers binary potential function $f_{i,j}(x_i,x_j)$ where the first variable index is smaller than the second variable index (i<j). A MAP solution represented as MAP-MRF(H,$f$) is defined as a state that maximizes the total potential function $f(x)$ over all states $x=(x_1, x_2, x_3, x_4, x_5)$ in the state space of the MRF ($x \in H$); definition of a MAP solution was shown as equation B. The table in FIG. 6 illustrates possible states and their corresponding total potentials $f(x)$ of Jenny's MRF, where " . . . " should be read as indicating omitted rows to save space in the figure; only 5 total potential function values $f(x)$ of the possible 240 potential function values $f(x)$ are shown. Note that Jenny's MRF has a state space size of $|H|=|H_1| \times |H_2| \times |H_3| \times |H_4| \times |H_5|=4 \times 4 \times 4 \times 3 \times 6=1,152$ states. Each row of the table shows one assignment of states to variables $X_1$ to $X_5$ (410-450); and the corresponding total potential function value (610-650), or the sum of its binary and unary potentials as per equation A. It can be seen from FIG. 6 that the state of row 640 $x=(0, 3, 1, 2, 4)$ has a total potential function value of 3.213 (640) which is a value larger than any other row in the table (including the unseen rows); hence, the state is called a MAP solution of Jenny's MRF.

An important element of a branch-and-bound method to produce a MAP-MRF solution is a method to produce a part upper bound. The tightness of the part upper bound affects the number of splits for finding the exact MAP solution of a given MRF. A part upper bound is said to be tight if the difference is small between the part upper bound and the maximum total potential function value over all possible states of the part. The time to compute the part upper bound of any state space of a given MRF is an important factor for an efficient MAP-MRF branch-and-bound solver.

Herein described is a method and system of producing a part upper bound which is called a "dynamic f-zero bound function". The method is fast to compute and produces tight part upper bounds. The method is based on a technique known as a dual-potential upper bound, but the method is designed to dynamically adapt to the changes of the MRF state spaces of the newly split parts as the process proceeds.

An upper bound function of the total potential function of an MRF is a function from state subsets or parts of the original state space of the MRF to real values. A value of the function of any part is always greater than or equal to the maximum of the total potential function over all states in that part.

At a high level, the dynamic f-zero bound function is such an upper bound function. The dynamic f-zero bound function is defined as the sum of upper bounds of all variables, where each of the upper bounds of a variable is defined as the maximum of all upper bounds of states of that variable in the input part (i.e. in the set of data being processed). Each upper bound of a state of a variable is calculated as the sum of the unary potential of that state, and the so-called binary state upper bound of that state. It will be understood that the binary state upper bound of a state of a variable is dynamically computed based on the number of possible states of the variable and the neighbours of the variables.

Based on the described dynamic f-zero bound function, two MAP-MRF solvers are described, which we call "DFZ-BS solver" and "DFZ-RS solver". DFZ-BS stands for dynamic f-zero-binary split; while DFZ-RS stands for dynamic f-zero-range split. Both solvers use the dynamic f-zero bound function but employ different heuristics for splitting a part. DFZ-BS uses a so-called binary-split strategy for splitting a part, i.e. splitting a state space into subsets of the state space; while DFZ-BS uses a so-called range-split strategy. The heuristics for splitting a part (or splitting the data set) include choosing a variable in which to split a state space of that variable, ranking states of the chosen variable, and splitting the states of the chosen variable based on the ranking. This splitting is repeated and performed for each variable.

An embodiment using the dynamic f-zero bound function will now be described.

A given MRF has a set of m variables $X_1, X_2, \ldots, X_m$. A branch-and-bound MRF solver divides an original state space into smaller and disjoint subsets called parts based on a part upper bound. A part is nominated such that it has a state space $H=\Pi_i H_i$ where $H_i$ is the state set of variable $X_i$ within the part.

An upper bound function U is a function defined from possible state spaces of an MRF to real values. Thus U(H) is a real value calculated as the part upper bound for the part with state space H, or in short, an upper bound for part H. Furthermore, U(H) is such that the total potential of any state $x=(x_1, \ldots, x_m) \in H$ is less than or equal to U(H). For a part with state space H, the value U(H) is called a part upper bound. Therefore, a part upper bound value may be calculated for a subset of data, which is taken from the complete set of data associated with state space H.

In summary, the part upper bound value is calculated by arranging image data in a Markov random field (MRF). The state upper bound values are calculated for associated pairs of variables in the image data, which are associated with an edge in the MRF. The state upper bound values are calculated by assigning the maximum state values of all of the states of a first variable of the pair of variables to the states of a second variable of the pair of variables. In this way, only unary potential functions and binary potential functions of one of the two variables is required to be calculated.

The first and second variables are selected from the pair of variables based on a number of states within each of the first and second variables. That is, the definition of which of the two variables is the first variable and which is the second variable is based on the number of states within each of the first and second variables. If it is determined that one variable in the pair of variables has more states than the other variable in the pair of variables, then the first and second variables are selected based on that determination. For example, if it is determined that variable A has more states than variable B, then the unary potential function and binary potential function of variable B is calculated. In another example, where it is determined that both variables have the same number of states, the process ensures that the same variable is always processed in the same way when it is part of a pair of variables.

Therefore, the system is arranged so that the image data associated with a captured image is obtained. For example, the image data may be retrieved from memory from any suitable location. It will be recalled that the image data includes a large number of variables where each of the variables has one or more states. The image data set is split into two separate subsets of data according to any suitable splitting method. Each of the first and second subsets of image data are then processed according to the method described herein. That is, the variables of a first subset of data are arranged of into the MRF. The unary potential values of each state of each variable in the subset of data are calculated. For each edge in the MRF, one of two variables associated with an edge is selected based on the number of states in those variables. For each edge in the MRF, the binary state upper bound for the selected variable is calculated. The unary potential values and binary potential values are summed during the process to eventually produce a part upper bound value.

A queue is used to store parts or subsets of the data, which are being processed. Initially, the queue contains a single part, which is the original data or state space.

At each iteration, the set of data with the highest value part upper bound value is taken from the queue. This set is then split into two further sets (or parts) based on defined criteria. The two new sets of data are then inserted back into the queue. Next, the sets of data in the queue are re-sorted such that the set with the highest value part upper bound stays at the top of the queue.

The above process is repeated until the part taken from the queue contains only a single state. And this single state is the single state solution the system is searching for. This single state solution is the most likely result and so identifies the content from the image data based on the process carried out. This single state solution may then be output from the system to the user in order to identify the content.

The splitting of the data may be carried out according to any suitable method. For example, the splitting method may rank the states of each variable based on the unary potential and binary state upper bound values, and then split the image data based on that ranking.

For example, the image data may be split based on a threshold value for the determined unary potential and the determined binary state upper bound values of each of the ranked states.

As a further example, the image data may be split by splitting the ranked states into two substantially equal sets where a first set of ranked states has a higher rank than a second set of ranked states.

In more detail, the dynamic f-zero bound function $U(H)$ is the sum of all variable upper bounds $U(H_i)$ of variables $X_i$, $$U(H) = \Sigma_i U(H_i).$$

Each variable upper bound $U(H_i)$ is the maximum over all state upper bounds $u_i(x)$ of states $x \in H_i$ $$U(H_i) = \max_{x \in H_i} u_i(x)$$

A state upper bound $u_i(x)$, of a state $x \in H_i$ of a first variable of a pair of variables $X_i$, is the sum of the variable's unary potential $f_i(x)$ and of the variable's binary state upper bounds, $$u_i(x) = f_i(x) + \Sigma_j w_{i,j,x}.$$

Here binary state upper bound $w_{i,j,x}$ is a quantity defined for a second variable of a pair of variables $X_j$ with index j (the second variable's index), where $X_j$ is connected by an edge to the first variable of the pair of variables $X_i$ in the undirected graph of the given MRF.

As a summary up to this point, the upper bound of a part H, U(H), is the sum of all variable upper bounds $U(H_i)$. Each variable upper bound of a variable $X_i$ is defined as the maximum of state upper bound $u_i(x)$ over all states x in the set of possible values $H_i$ of variables $X_i$.

The binary state upper bound of a state x of the variable $X_i$, $w_{i,j,x}$, is calculated as the maximal binary potential over the binary potentials of state x and state y of variable $X_i$ and $X_j$ respectively, $\max_{y \in H_j} f_{i,j}(x,y)$, under a condition, or otherwise the binary state upper bound is set to zero. The condition is that variable $X_i$ has at least as many states as variable $X_j$; or the two variables $X_i$ and $X_j$ have the same number of states; and that the index i (the first variable's index) is smaller than the index j (the second variable's index).

$$w_{i,j,x} = \begin{cases} \max_{y \in H_j} f_{i,j}(x,y), & \text{if } |H_i| > |H_j| \vee (i < j \wedge |H_i| = |H_j|) \\ 0, & \text{otherwise} \end{cases}$$

Figure 7A:
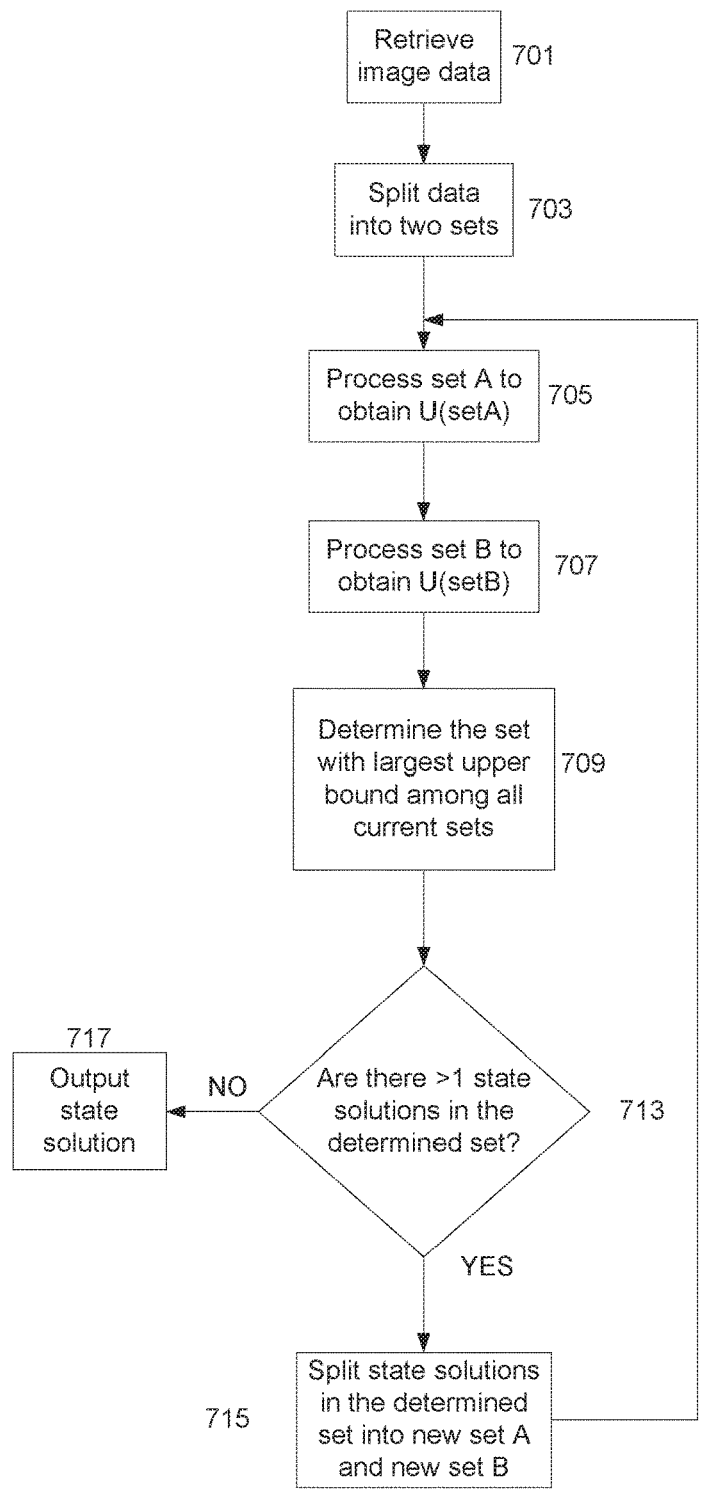
FIG. 7A is a flow chart for a method to solve a MAP-MRF problem, using a branch-and-bound method according to the present disclosure.

Referring to FIG. 7A, the process in general starts at step 701 by retrieving the image data. At step 703, the image data is split into two sets, A and B. At step 705, the data in set A is processed as described herein to calculate the part upper bound value for that set of data. At step 707, the data in set B is processed as described herein to calculate the part upper bound value for that set of data. The two upper bound values are compared at step 709 and the set with the largest part upper bound value among all current sets of data is determined. The system continues processing using the set with the largest part upper bound value. At step 713, a determination is made whether there is more than one state solution in the determined set. If there is more than one state solution in the determined set, at step 715, the state solutions are split in the determined set into new data sets A and B, and the process is repeated at step 705. If there is only one state solution in the determined set, at step 517 the state solution is output.

Figure 7B:
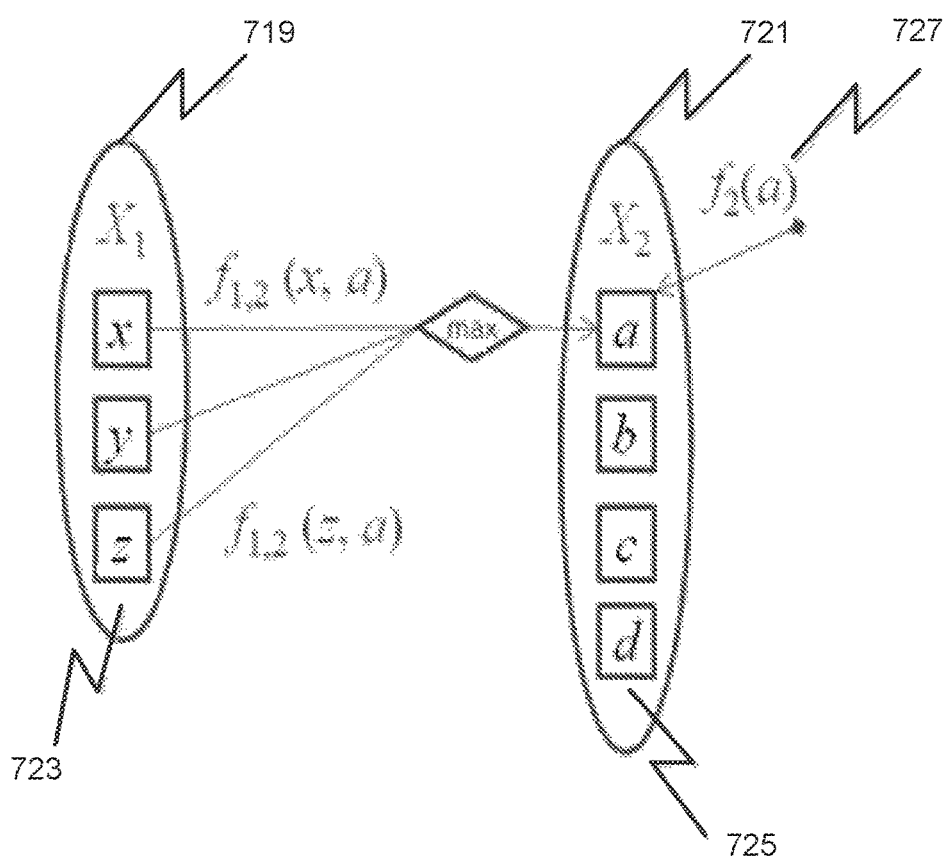
FIG. 7B is a representation of two variables that share an edge according to the present disclosure.

FIG. 7B shows a pictorial representation of the calculation of $u_i(x) = f_i(x) + \Sigma_j w_{i,j,x}$ where $X_1$ (719) is $X_i$ and $X_2$ (721) is $X_j$. Variable 719 has three states x, y and z (723). Variable 721 has four states a, b, c and d (725). The first variable a of variable $X_2$ (721) has a unary function f2(a) (727). The maximum values of states x, y and z are added to the unary function of state a. Therefore, the chance of errors is minimized by "pushing" or transferring the values from the variable with the lower number of states ($X_1$) to the variable with the higher number of states ($X_2$).

Figure 8A:
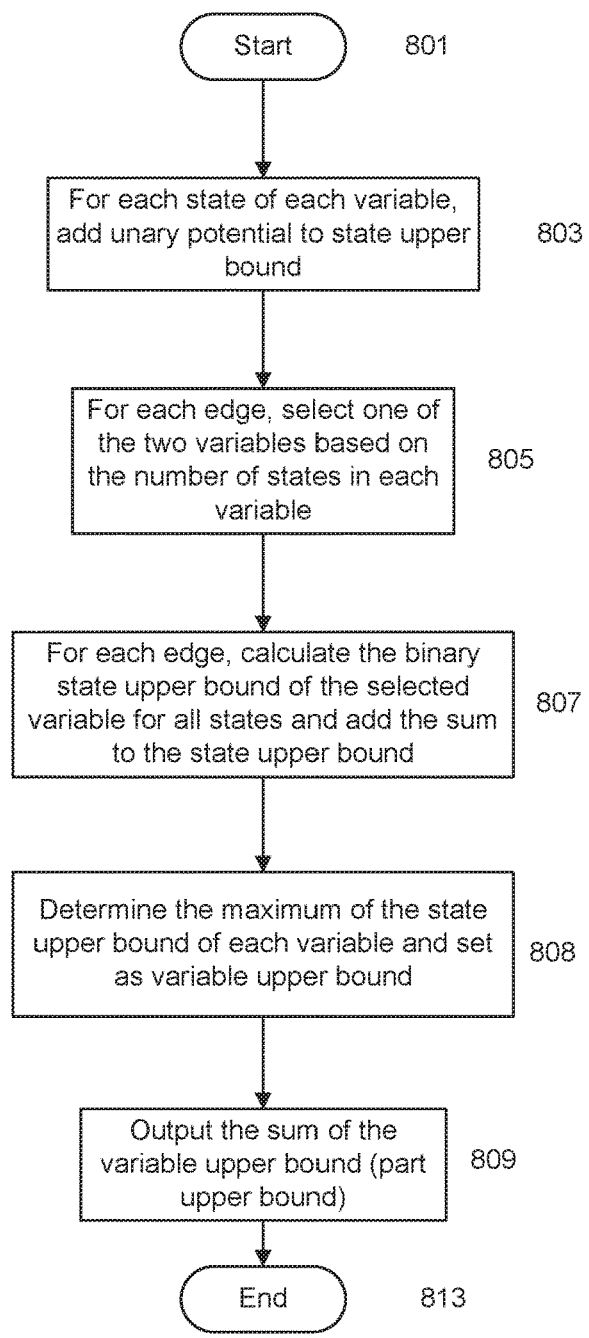
FIGS. 8A and 8B are flow charts of the content identifying method according to the present disclosure.

FIG. 8A shows this process as follows. At step 801, the process starts. At step 803, the unary potential of each state is calculated for each variable, and this value is added to a state upper bound value. At step 805, for each edge, one of the two variables is selected based on the number of states in each of the variables. At step 807, for each edge, the binary state upper bound is calculated for the selected variable and added to the total for the state upper bound value. After calculating all values for each variable, a maximum of the state upper bound of each variable is determined 808. The maximum is determined by finding the state upper bound with the largest value. The value for the maximum state upper bound is then set as a value for upper bound of the variable. A sum of the variable upper bounds is output at step 809 as the part upper bound value. The process ends at step 813.

In situations where the variables have the same number of states, a decision must be made as to which variable to select for processing. Therefore, an additional step is introduced to check whether the first variable $X_i$ has the same number of states as the second variable $X_j$. If the answer is 'yes', the next step sets the binary state upper bound of state x, $w_{i,j,x}$, to zero.

Therefore, if the first and second variables are tied in the number of states, one of the two variables must be selected to assign the value to. Any technique may be used as long as the technique will ensure that the values are assigned in a repeatable manner. Repeatability is required to ensure that the values are assigned to the same variable when the first and second variables are processed in opposite roles during later processing. For example, during initial processing, the first variable may be $X_3$ and the second variable may be $X_4$, whereas when being processed later, the first variable would be $X_4$ and the second variable would be $X_3$. One example of deciding how to process in this situation is to check if the first variable index i is less than the second variable index j.

Figure 8B:
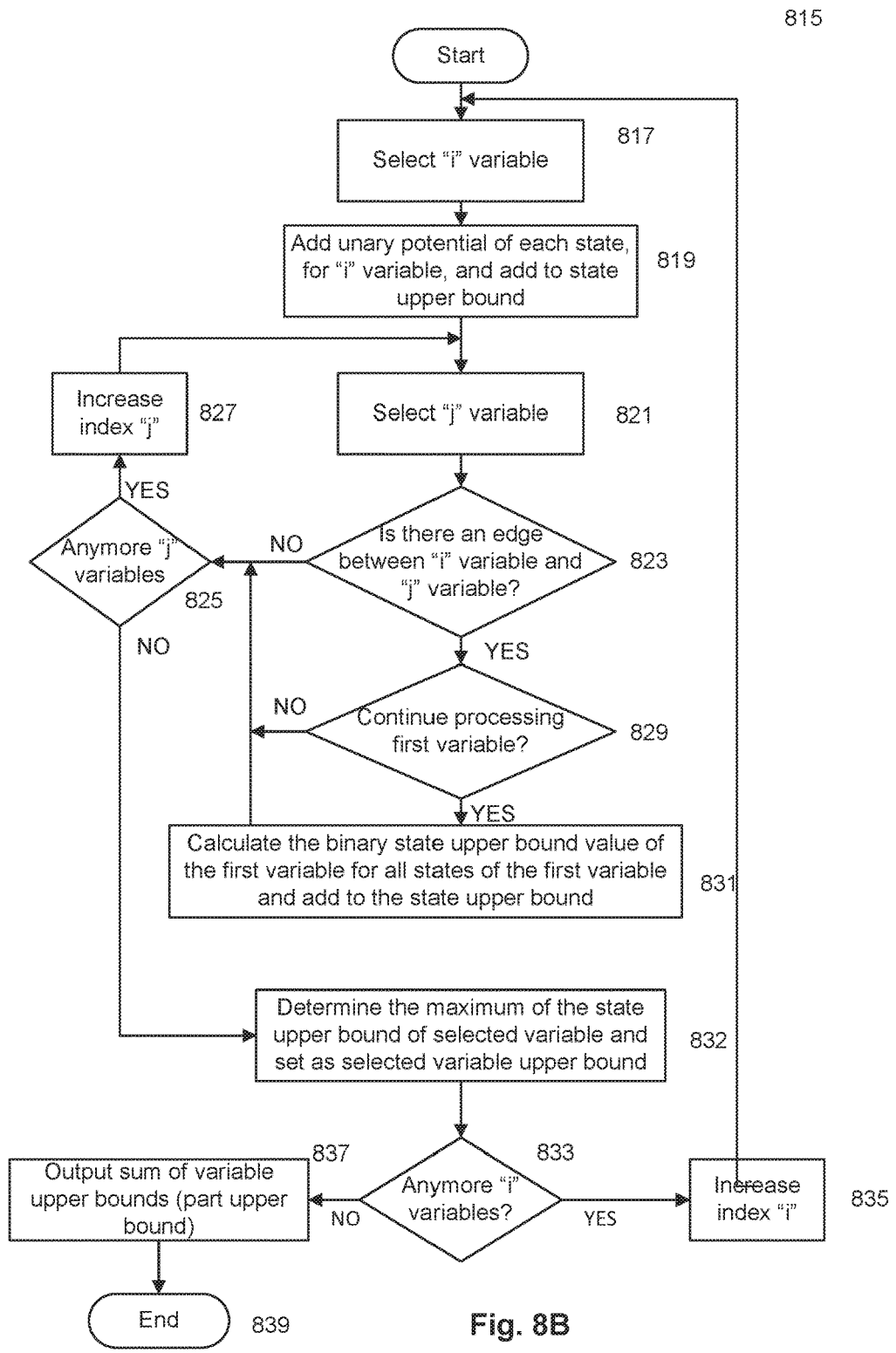

FIG. 8B shows a method 815 to determine a part upper bound U(H) for a part H. Input to the method 815 is the part H together with the given MRF's specifications including its undirected graph, and unary and binary potential functions. Output of the method is a part upper bound U(H) for the part H. Each part H is a sub state space of the original state space, which contain states of variables. Unary potentials of states and pairwise potentials among states are processed to determine an upper bound for the part H.

The method 815 starts at a selection step 817 where a first variable index i is used to select a variable from the part H. The selection step 817 is the beginning of the calculation of the variable upper bound $U(H_i)$ of the variable $X_i$.

Next, addition step 819 adds a unary potential of each state x of the current variable $X_i$ to the state upper bound. $u_i(x)$. The calculation of the state upper bound $u_i(x)$ is performed to determine the variable upper bound $U(H_i) = \max_{x \in H_i} u_i(x)$, which is a maximum value over all state upper bounds of states of the variable $X_i$.

At selection step 821 a second variable $X_j$ is selected. The selection step 821 is the start of a loop that will process all second variables. The purpose of the loop is to process all the second variables that are adjacent to the first variable in order to compute the variable upper bound of the first variable. Recall that a variable is adjacent to another variable if there is an edge between the two variables in the undirected graph of the given MRF.

Next, an edge check step 823 determines if there is an edge of the MRF between the first variable $X_i$ and the second variable $X_j$. If there is no edge 'no', the method 815 moves to a check step 825 to see if all second variable have been processed. If there is an edge 'yes', then the method 815 proceeds to continue-processing step 829.

The continue-processing step 829 decides if the first variable will be processed based on a comparison of the number of states in the first and second variable. If the first variable has more states than the second variable, then method 815 will continue to calculate step 831. If the first variable has fewer states than the second variable then the method 815 proceeds to a check step 825 to determine if there are any more second variables to be process. If the number of states in the first and second variables is the same, then one of the two variables must be selected to assign the value to. Any technique may be used as long as the technique will ensure that the values are assigned in a repeatable manner. Repeatability is required to ensure that the values are assigned to the same variable when the first and second variables are processed in opposite roles during later processing. For example, if the first variable is $X_3$ and the second variable is $X_4$ then later processed as the first variable being $X_4$ and the second variable being $X_3$. One way to break a tie is to check if the first variable index i is less than the second variable index j.

If the first variable is to be processed then the method 815 carries out the calculate step 831 to process each state x of the first variable $X_i$ and set the binary state upper bound of state x (with respect to the second variable $X_j$), $w_{i,j,x}$, to the maximum binary potential over the binary potentials between state x of the first variable $X_i$ and states y of the second variable $X_j$. That is, the calculate step 831 sets $w_{i,j,x}$ to $\max_{y \in H_j} f_{i,j}(x,y)$. The result is that the binary state upper bound of the first variable, for all states of the first variable, is calculated. The calculated state upper bound is then added to the state upper bound of the first variable.

At the completion of the calculation step 831 the method 815 proceeds to the check step 825. The check step 825 examines if all second variables have been processed by determining if the second variable index j of the second variable $X_j$ is still less than or equal to the total number of variables m. If 'yes', an increment step 827 continues the loop to select a next second variable $X_j$ by increasing the second variable index by one before control is passed back to the selection step 821. If 'no' then the second variable loop terminates and the method 815 proceeds to a determining step 832.

The determining step 832 determines the maximum of the state upper bound of the selected variable and sets the maximum of the state upper bound as the upper bound of the selected variable. That is, the variable upper bound of the first variable $X_i$, $U(H_i)$, is assigned to the maximum state upper bound over states x of the first variable $X_i$, $\max_{x \in H_i} u_i(x)$.

The method 815 proceeds to a check step 833. The check step 833 determines if all of the first variables have been processed by checking if the first variable index i is less than or equal to the total number of variables m.

If the answer at step 833 is 'yes', then control is passed to increment step 835 where the value of i is increased. If the check step 833 is 'no' then the part upper bound U(H) is returned at the output step 837 before the method 815 terminates at termination 839. When the method terminates, the output step outputs the part upper bound of part H, U(H), is the sum of all variable upper bounds of all variables $X_i$, $U(H_i)$; that is, $U(H) = \Sigma_i U(H_i)$.

Figure 9:
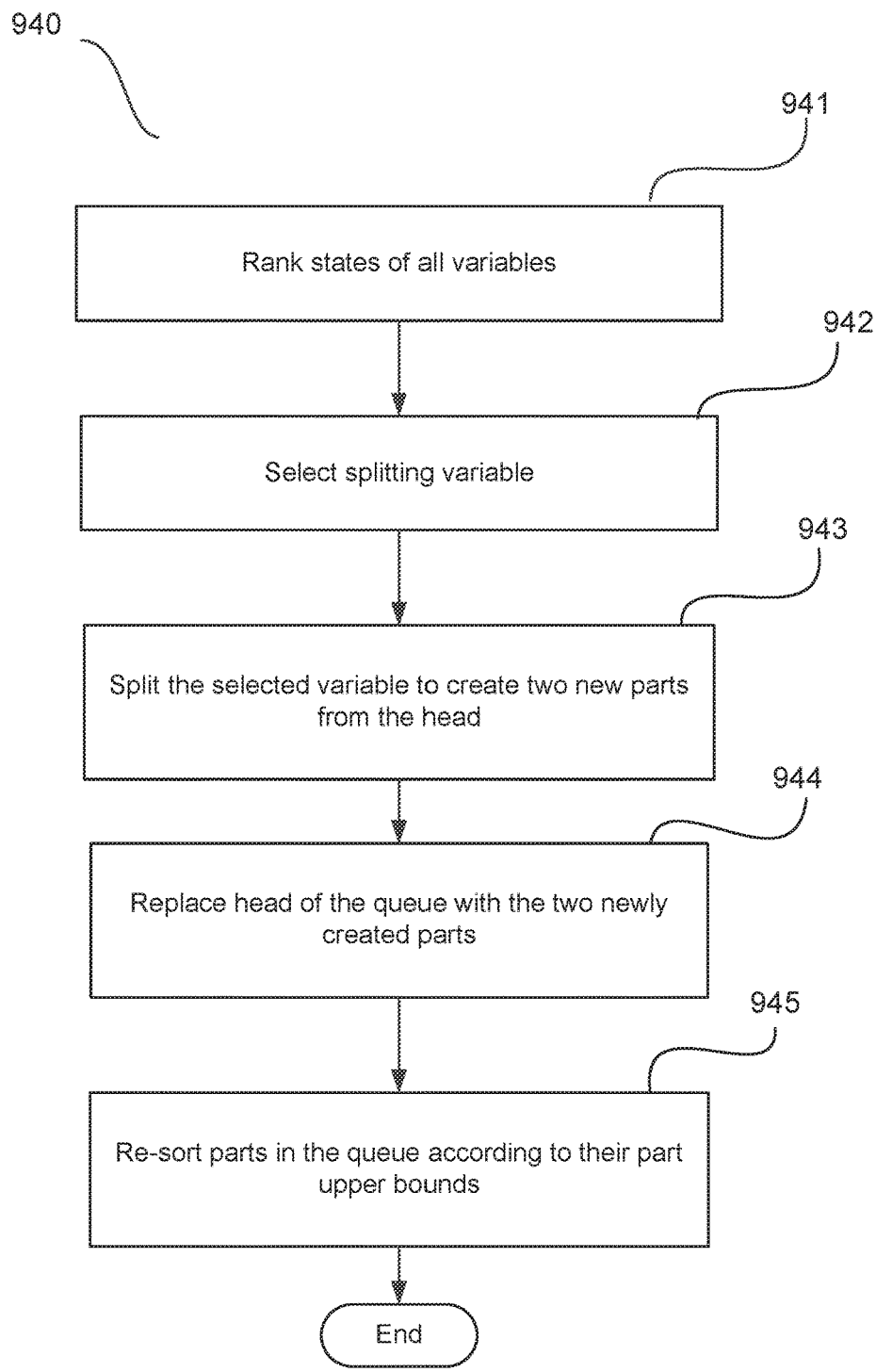
FIG. 9 is a flow chart for a method of the split head and update queue step according to the present disclosure.

A first detailed explanation of a splitting function using the dynamic f-zero bound function will now be described. This example is called a DFZ-BS solver, which uses a branch-and-bound method that uses the dynamic f-zero (DFZ) bound function, and a so-called binary-split (BS) strategy for splitting states of variables. A flow diagram of the DFZ-BS solver method is shown in FIG. 9. This process, as explained, is used to determine how the head is split, i.e. to determine how the data set is subsequently split again after processing.

Note that the queue used in the DFZ-BS solver is a priority queue where the element with the highest priority stays at the head of the queue. Each element of the queue will be a part, which is a possible state space of the input MRF. The priority of a part is a part upper bound, which is calculated using the dynamic f-zero bound function. Throughout the method, a part can be the original state space of the input MRF, or a subset of the original state space. If the queue is non-empty, all parts in the queue form a partition of the original state space.

FIG. 9 describes the method 940 for splitting the head and updating the queue forming step 715 of FIG. 7A. The method takes as input the head and queue at the end of the process described in and returns a queue with the head replaced by two new parts, and the new head part of the queue is the part with largest upper bound, or largest value of the dynamic f-zero bound function. That is, the head is the part in the queue with highest priority.

The method 940 starts at a state ranking step 941, which ranks states of each variable. At step 941, for each variable $X_i$ of the input MRF, rank states x of variable $X_i$ according to a so-called potential expectation denoted by $$E[f(x) | x_i = x] = f_i(x) + \sum_j \frac{1}{|\mathcal{H}_j|} \sum_{y \in \mathcal{H}_j} f_{i,j}(x, y),$$

which is a sum of the unary potential of state x, $f_i(x)$, and the sum of the average binary potentials between state x of variable $X_i$ and states y of variables $X_j$ that are adjacent to node $X_i$, $$\sum_j \frac{1}{|\mathcal{H}_j|} \sum_{y \in \mathcal{H}_j} f_{i,j}(x, y).$$

Here node $X_j$ is adjacent to node $X_i$ if there is an edge in the undirected graph of the MRF between the two variables; for example, in FIG. 4, variable $X_1$ is adjacent to variables $X_2$ and $X_5$. The potential expectation of a state x of a variable $X_i$ is an estimate of the importance of that state x towards its contribution to a total potential $f(x)$ where the $i^{th}$ coordinate is state x, $x_i=x$.

The next step is a variable-selection step. Step 942 chooses the variable $X_i$ to split the head part such that if it splits, the head part is divided into two parts $H^1$, and $H^2$ such that the maximum upper bound of the two newly split parts $\max(U(H^1), U(H^2))$ is minimal over all possible options of choosing variables $X_1, \ldots, X_m$ for splitting the head part. The criterion is designed to avoid a dramatic change in the upper bounds of the two new parts, $U(H^1)$ and $U(H^2)$, compared to the original upper bound, $U(H)$. A dramatic change often results in a significant effort to re-sort the queue later in the step 945.

After the variable-selection step 942, the state-splitting step 943 splits the ranked states of the chosen variable $X_i$ from step 942 into two groups of roughly equal sizes. The high-ranked states are in one group and the rest in the other group. The two groups of states of variable $X_i$ in combination with states of the other variables in the head part of the queue form two newly split parts. This state-split strategy is called binary split (BS) as the order of states of the chosen variable $X_i$ from step 942 are predetermined in step 941, and the split of states of the variable can be represented as a pre-determined binary tree. Next, control is passed to a queue modification step 944.

The queue modification step 944 replaces the current head part of the queue with the two newly created parts obtained from step 943. The upper bounds, or the priority states, of the two newly created parts are computed using the dynamic f-zero bound function as described above in the first example.

The next step is a queue re-sorting step 945 where parts in the queue are re-sorted to maintain the priority order in the queue; the order is such that the head of the queue is the part with the largest upper bound. The method then returns the re-sorted queue and terminates.

An important point to note here is that the DFZ-BS solver always finds the exact MAP solution in finite time. A perfect branch-and-bound solver is expected to find the MAP after $O(\log(|H|))$ iterations where H is the state space of the input MRF, $|H|$ is the total number of states in the state space H. Here $O(\log(|H|))$ represents a quantity of at most $\alpha \times \log(|H|)$ for all $|H| \geq h_0$, where $\alpha$ is some positive constant, and $h_0$ is some positive integer.

Another example of a splitting method is now described for the MAP-MRF solver called the DFZ-RS solver, a branch-and-bound method that also uses the dynamic f-zero (DFZ) bound function as in the above DFZ-BS solver, and employs a so-called range-split strategy for splitting states of variables. The DFZ-RS solver is different from the DFZ-BS solver in its splitting heuristics.

Splitting heuristics of a branch-and-bound solver may include choosing a variable to split, ranking states of the chosen variable, splitting the states of the chosen variables into two groups of roughly equal sizes. The DFZ-RS solver ranks states of all variables first, then chooses the variable to split, and splits the states of the chosen variable.

Ranking states, which corresponds to step 941: for each variable $X_i$, its states $x \in H_i$ are ranked according to their state upper bounds $u_i(x)$. The formula to calculate the state upper bound of state x, $u_i(x)$, is shown above. The steps to compute the state upper bound of a state are described above.

Choosing a variable $X_i$ to split, which corresponds to step 942: for each variable $X_i$, determine the states that are above the mid-point of the range of $u_i(x)$ for $x \in H_i$. If less than half the states of variable $X_i$ are above the mid-point then use the determined states for one group, and the rest for the other group. Otherwise, divide states of variable $X_i$ into two groups of equal size, with states of high $u_i(x)$ in one group, and states of low $u_i(x)$ in the other. The chosen variable to split is the one with the smallest number of states in the high-ranked group. Ties where the variables have the same number of states are broken arbitrarily as described herein.

Splitting the ranked states of the chosen variable $X_i$, which corresponds to step [6]43: use the above two pre-determined groups for splitting variable $X_i$. This state-split strategy is called range split (RS) as the order of states of the chosen variable $X_i$ from step 941 are determined via the range of its states $u_i(x)$.

The herein described methods, and MRFs in particular, are useful for modelling states of a system, or a framework which has variables, or quantities, and interactions among them. The interactions are such that the occurrence of the states of some quantities will have inter-dependency on the occurrence of some states of some other quantities. The herein described system and method can be used to quickly solve the problem of finding the most probable state of the system or the problem of finding the most probable states of the considered quantities.

As a tool for probabilistic modelling, the herein described system and method may be widely applied to fields such as robotics, molecular biology, image processing, and computer vision. Below are a worked sample and several use cases in these domains where the problems can be formulated as a MAP-MRF problem as defined above. These use cases are illustrated through the Jenny's MRF and its MAP-MRF problem shown in FIG. 6. In particular, the worked example on human pose estimation will walk through the method as described herein to show how the part upper bound of a part is calculated.

According to one example, a human pose estimation problem may be solved by determining the most likely pose of a person in a particular scene captured as an image by a camera. For example, a pose may be defined by angles between predetermined body parts of the person. The angles are denoted as $X_1, \ldots, X_m$. Common body parts considered for this problem are neck, upper arms, lower arms, upper legs, and lower legs. An angle of a body part is the relative angle between the body part and the person's main body from neck to bell. Different angles of a body part have different occurring potentials. Denote the binary potential function of angle $X_i$ as $f_i(x_i)$ where $x_i$ is a possible angle state of $X_i$. The angle of some body part has inter-dependency on the angle of some other body parts. For example, the angle of an upper arm is likely to affect the angle of the lower arm of the same arm, and vice versa. Denote the potential function, or the occurring potential of two body-part angles $X_i=x_i$, and $X_j=x_j$ as $f_{i,j}(x_i,x_j)$. This problem may be formulated as an MRF called a human pose-estimation MRF. The body-part angles $X_1, \ldots, X_m$ may be MRF variables. The unary potential function may be the unary potential function $f_1(X_1=x_1)$ of this human pose-estimation MRF. The binary potential function may be the unary potential function $f_{1,2}(X_1=x_1,X_2=x_2)$ of the human pose-estimation MRF. A human pose estimation problem of finding a most likely pose of a person is thus formulated as an MAP-MRF problem.

Assume that the human pose under consideration is determined by three angles of three body parts, namely upper left arm, upper right arm and the head. Denote those angles respectively by $X_1$, $X_2$, and $X_3$. Suppose that there are two interdependencies among the angles: interdependency between upper left arm and the head, and interdependency between upper right arm and the head. That is, the human pose estimation problem forms a Markov random field with three variables $X_1$, $X_2$, and $X_3$. There are two edges in the undirected graph of the Markov random field, one between variable $X_1$ and variable $X_3$, and another between variable $X_2$ and variable $X_3$. Unary potential functions of the MRF are $f_1(x_1)$, $f_2(x_2)$, and $f_3(x_3)$. Binary potential functions are $f_{1,3}(x_1,x_3)$ and $f_{2,3}(x_2,x_3)$ where $x_i$ is a state of variable $X_i$. Suppose that each variable has six possible angle values (measured in degree): −180, −120, −60, 0, 60, and 120. Denote those values by $s_1, \ldots,$ and $s_6$. The state space of the problem, H, is the set product of all sets of possible values of all three variables, $H_1$, $H_2$ and $H_3$. That is, $H=H_1 \times H_2 \times H_3$ where $H_i=\{s_1, \ldots, s_6\}$. A part is a region or a subset of the original state space, H. Suppose a part H' is composed of three sets of possible values of the three variables, $H_1'$, $H_2'$, and $H_3'$. Further assume that in part H', variable $X_1$ has three possible values $H_1'=\{s_1, s_2, s_5\}$; variable $X_2$ has two possible values $H_2'=\{s_3,s_5\}$; and variable $X_3$ has two possible values $H_3'=\{s_4,s_5\}$.

The part upper bound of part H', U(H'), can be calculated using the method 815 described above in FIG. 8B. Details of the steps for calculating the bound are as follows.

The method 815 starts with selecting the "i" variable $X_1$ at step 817.

The addition step 819 takes the unary potentials $u_1 f_1(s_1)$, $u_1 f_1(s_2)$, $f_1(s_5)$ of the first variable $X_1$ and adds them to the state upper bound of each state of the first variable $X_1$, that is, $u_1(s_1)=f_1(s_1)$, $u_1(s_2)=f_1(S_2)$, and $u_1(s_5)=f_1(s_5)$ Selection step 821 selects the second "j" variable of. In this instance the selected variable is $X_1$.

At the edge check step 823 the method 815 verifies if there is an edge between the first variable $X_1$ and the second variable $X_1$ and the answer is 'no'. The method 815 moves to check step 825 to see if there are more second "j" variables to process. The answer is 'yes' so index "j" is increased at increment step 827 before returning to selection step 821 where a new "j" variable is selected. The new variable is $X_2$. However, there is no edge between the first variable $X_1$ and the second variable $X_2$ so edge check 823 returns 'No'. Another check is made to see if there are more second "j" variables. The answer is 'yes' and a new "j" variable is selected at selection step 821 after "j" was increased at the increment step 827. The second variable is now selected as variable $X_3$. Check step 823 is determined to be a 'yes' as there is an edge between the first variable $X_1$ and the second variable $X_3$. Next the continue-processing step 829 determines if the processing of the two variables should continue. The conclusion to the continue-processing step 829 is based on the number of states in the first and second variable. The first variable $X_1$ has three states $s_1$, $s_2$ and $s_5$ while the second variable $X_3$ has two states $s_4$, and $s_6$.

As a result, the first variable has more states than the second variable and the continue-processing step 829 results in a 'yes'. At the calculate step 831 the binary state upper bound of the first variable is calculated. The binary state upper bound is calculated by setting each state x of the first variable $X_1$, $w_{i,j,x}$, to a maximum among the binary potentials between the first variable $X_1$ and the second variable $X_3$, where value of the first variable is state x. That is, $w_{1,3,x}=\max_{y \in H_3} f_{1,3}(x,y)$. Next the binary state upper bound $w_{1,3,x}$ is added to the corresponding state upper bound $u_1(x)$ for each state x of the first variable $X_1$, $x \in H_1'=\{s_1, s_2, s_5\}$; that is, $u_1(x)=u_1(x)+w_{1,3,x}$.

Control of the method 815 returns to check step 825 once the continue-processing step 829 is complete. There are no more "j" variables so the output of check step 825 is 'no' and the method moves to the determination step 832 where the upper bound $U(H_1)$ of the first variable is set be equal to the value of the state with the maximum value. That is, $U(H_1')=\max\{u_1(s_1), u_1(s_2), u_1(s_5)\}$.

The check step 833 is executed to determine if there are any more "i" variables for processing. The present example has only processed one "i" variable $X_1$ and would proceed to the increment step 835. At the increment step 835 the value of "i" would be increased and control of method 815 returns to selection step 817 to select $X_2$ as a new first variable. The loops described above would repeat for the second, "j", variable and repeat for the final first variable, $X_3$. Such steps will be similar to the steps described above for the human estimation example and will not be described in further detail.

Once all the variables have been processed, the method 815 moves to the output step 837. At the output step 837 the first variable upper bounds for $X_1$, $X_2$ and $X_3$ are added to the part upper bound U(H'). Hence, $U(H')=U(H_1')+U(H_2')+U(H_3')$. The method 815 ends at the termination step 839.

A semantic image segmentation use case is now provided. This use case relates to a classification problem where each data point includes all superpixels of an image. Superpixels are small and mutually exclusive regions of contiguous pixels of an image. This problem is modelled as a conditional random field (CRF), which is an MRF where some potential functions are conditioned on some input information.

A CRF has variables $X_1, \ldots, X_m$ conditioned on input information $y_1, \ldots, y_m$. The CRF has a model parameter vector w that needs to be learnt. The unary potential function of node $X_i$, $f_i(x_i, y_i, w)$, is a function of a state $x_i$ of $X_i$, its input information $y_i$ and model parameter w. The binary potential function of node $X_i$ and node $X_j$, $f_i(x_i, x_j, y_i, w)$, is a function of a state $x_i$ of $X_i$, its input information $y_i,y_j$, and model parameter w. Hence, conditioned on input information $y=(y_1, \ldots, y_m)$, the CRF becomes an MRF. One important problem of CRF is learning parameter w, which often involves solving of the MAP-MRF problem. Examples of learning methods that needs to use MAP-MRF solvers include maximum likelihood of CRF, and structural SVM.

Each superpixel of an image is modelled as a CRF variable. A common undirected graph structure used for this example, often called grid, has an edge between any two adjacent superpixels. More specifically, states of a variable $X_i$ are often of ordinal types such as car, road, bird, water, ... ; input information $y_i$ often includes features of the superpixels.

A protein side-chain prediction use case will now be described. One fundamental problem in molecular biology is the protein side-chain prediction problem, which aims to predict the amino acid sequence of a protein given its three dimensional folding structure called its backbone; the sequence comprises of amino acid units joined end to end. Each amino acid unit in the amino acid sequence is called a residue, which is modelled as a variable with its possible states being specific amino acid units. The residues that make up a protein are denoted by $X_1, \ldots, X_m$. The potential function that a residue is some amino acid unit is a function of the amino unit itself and the backbone. This function is denoted as $f_i(X_i=x_i,\text{backbone})$ with $x_i$ being a possible amino acid units of residue $X_i$. It is assumed that there are pairwise interactions among nearby residues, where the nearness between two residues is determined via the given backbone of the protein. The binary potential function representing the interaction between two amino acids $X_i=x_i$ and $X_j=x_j$ is denoted as $f_{i,j}(x_i,x_j)$. Hence, a protein side-chain prediction may be formulated as an MRF called a side chain-prediction MRF. An example unary potential function can be the unary potential function $f_1(X_1=x_1,\text{backbone})$ of this side-chain prediction MRF. An example binary potential function can be the unary potential function $f_{1,2}(x_1,x_2)$ of this side chain-prediction MRF. The protein side-chain prediction problem of finding the most probable placements of the residues $X_1, \ldots X_m$ that make up the given three dimensional folding structure of the considered protein is hence formulated as a MAP-MRF problem and solved using the methods described herein.

A multi-robot job allocation use case is now described. In this example, m robots are denoted by $X_1, \ldots, X_m$ attempt to complete a set of jobs over time. At each time step, there are m jobs $t_1, \ldots, t_m$ given to the robots. For simplicity, $X_i=t_h$ is denoted when $X_i$ does job $t_h$. Robot $X_i$ has its own utility or unary potential $f_i(X_i=t_h)$ when completing job $t_h$. Each robot $X_i$ performs a single job at any one time. The task is to find an assignment of jobs to the robots in order to maximise the total utility, which is the sum of all utilities of robots for completing their jobs $\Sigma_i f_i(X_i=t_h)$. Since each robot can only take a single job at a time, this constraint can be formulated as a binary potential function for each pair of robots; for example, the binary potential function for robots $X_i$ and $X_j$ is $f_{i,j}(X_i=t_h,X_j=t_k)=-\infty$ if $t_h=t_k$, or $f_{i,j}(X_i=t_h,X_j=t_k)=f_i(t_h)+f_j(t_k)$ if $t_h \neq t_k$. By this formulation, the multi-robot job allocation problem is described as a fully connected MRF, called multi-robot MRF, with variables $X_1, \ldots, X_m$, unary potential functions $f_i(X_i=t_h)$, and binary potential functions $f_{i,j}(X_i=t_h,X_j=t_k)$. The variables can be the variables of this multi-robot MRF. A unary potential function can be the unary potential function of the multi-robot MRF $f_i(X_i=t_h)$; and a binary potential function can be the binary potential $f_{i,j}(X_i=t_h,X_j=t_k)$ of the multi-robot MRF. A multi-robot MRF has interactions or binary potential functions between all pairs of variables, whereas the MRF illustrated in FIG. 4 does not have an edge between two variables 420 and 450. It can be seen that the problem of finding the assignment with the maximal total utility is equivalent to the methods as described herein.

A robot learning the most probable state of the environment use case is now described. A robot has a number of sensors, each of which measures a particular quantity of the environment around it at any one particular time. At each time step, a quantity measured by a sensor has a number of possible states. Each state has its own potential of occurrence. One approach to infer the state of the environment is to determine the most probable combination of the measured states from its sensors. Such a quantity of a sensor can be modelled as a variable with states as being the possible states. It is likely that some or all of these quantities have interactions with each other. A binary interaction between two of the quantities can be modelled as a binary potential function measuring the potential occurrence between states of the two quantities. The quantities of sensors are modelled by variables of an MRF such as the variables 410-50 in the example MRF shown in FIG. 4. The potential occurrence of each state of the quantity is represented as a unary potential function such as the unary potential function 405 of variable $X_1$ in the example MRF. The interactions among the quantities measured by the sensors of the robot are modelled by unary potential functions such as the binary potential function $f_{1,2}(x_1,x_2)$ between two variables $X_1$ and $X_2$. The problem of learning the most probable state of the environment, or the most probable combination of the states of the quantities measured by the sensors is therefore equivalent to the methods as described herein.

INDUSTRIAL APPLICABILITY

The arrangements described are applicable to the computer and data processing industries and particularly for the image processing industries.

The foregoing describes only some embodiments of the present invention, and modifications and/or changes can be made thereto without departing from the scope and spirit of the invention, the embodiments being illustrative and not restrictive.

The invention claimed is:

1. An image processing system for identifying content within image data, the image processing system comprising a processor arranged to:
   arrange semantic concepts in a Markov random field (MRF), the semantic concept being from image data of a captured image;
   calculate state upper bound values of pairs of variables in the image data that are associated with an edge of the Markov random field, each of the variables representing a possible state of the semantic concept captured in the image,
   wherein the processor is further arranged to calculate the state upper bound values by assigning maximum state values of all of the states of a first variable of the pair of variables to the states of a second variable of the pair of variables, and identifying the first and second variables from the pair of variables based on a number of states within each of the first and second variables, and
   determine a single state solution for identifying content in the image data based on the calculation of the state upper bound values; and
   identify content in the captured image according to the determined single state solution, each of the states in the single state solution being for the semantic concept of the captured image.

2. The image processing system of claim 1, wherein the processor is further arranged to:
   determine whether one variable in the pair of variables has more states than the other variable in the pair of variables, and
   identify the first and second variables from each pair of variables based on the determination.

3. The image processing system of claim 1, wherein processor is further arranged to:
   a) obtain the image data associated with a captured image, the image data comprising a plurality of variables where each variable has one or more states;
   b) split the image data into a first and second set of image data according to a defined splitting method;

c) process each of the first and second sets of image data, wherein the processor is further arranged to:
   i) arrange the variables of each of the first and second sets of data into the MRF;
   ii) determine a unary potential of each state of each variable in each of the first and second sets of data;
   iii) for each edge in the MRF, select one of a first and second variable associated with the edge based on the number of states associated with the first and second variables; and
   iv) for each edge in the MRF, determine a binary state upper bound for the selected first or second variable; and
d) determine the single state solution for identifying content in the image data based on the determined unary potential and determined binary state upper bound for each edge.

4. The image processing system of claim 3, wherein the processor is further arranged to:
   determine which of the first and second sets of data to continue processing based on the part upper bound values for each of the first and second sets of data;
   repeat steps b, c and d until a single state solution exists in the determined set of data; and
   output the single state solution.

5. The image processing system of claim 3, wherein the processor is further arranged to:
   determine a part upper bound value for each of the first and second sets of data based on the determined unary potential and determined binary state upper bound for each edge; and
   determine which of the first and second sets of data to continue processing based on the part upper bound values for each of the first and second sets of data.

6. The image processing system of claim 5, wherein the determination of which of the first and second sets of data to continue processing is made based on the first and second set of data that is associated with the highest part upper bound value.

7. The image processing system of claim 3, wherein the processor is further arranged to:
   rank the states of each variable based on the unary potential and binary state upper bound; and
   split the image data based on the ranking.

8. The image processing system of claim 7, wherein the processor is further arranged to split the image data based on a threshold value for the determined unary potential and the determined binary state upper bound of each of the ranked states.

9. The image processing system of claim 7, wherein the processor is further arranged to split the image data by splitting the ranked states into two substantially equal sets where a first set of ranked states has a higher rank than a second set of ranked states.

10. An image processing method for identifying content within image data, the method comprising the steps of:
    arranging semantic concepts in a Markov random field (MRF), the semantic concept from image data of a captured image;
    calculating state upper bound values of pairs of variables in the image data that are associated with an edge of the Markov random field, each of the variables representing a possible state of the semantic concept captured in the image,
    wherein the calculating step comprises the step of assigning maximum state values of all of the states of a first variable of the pair of variables to the states of a second variable of the pair of variables, and identifying the first and second variables from the pair of variables based on a number of states within each of the first and second variables, and
    determining a single state solution for identifying content in the image data based on the calculation of the state upper bound values; and identifying content in the captured image according to the determined single state solution each of the states in the single state solution being for the semantic concept of the captured image.

11. The method of claim 10, further comprising the steps of:
    determining whether one variable in the pair of variables has more states than the other variable in the pair of variables, and
    identifying the first and second variables from each pair of variables based on the determination.

12. The method of claim 10 further comprising the steps of:
    a) obtaining the image data associated with a captured image, the image data comprising a plurality of variables where each variable has one or more states;
    b) splitting the image data into a first and second sets of image data according to a defined splitting method;
    c) processing each of the first and second sets of image data based on a processing method comprising the steps of:
       i) arranging the variables of each of the first and second sets of data into the MRF;
       ii) determining the unary potential of each state of each variable in each of the first and second sets of data;
       iii) for each edge in the MRF, selecting one of the first and second variables associated with the edge based on the number of states associated with the first and second variables; and
       iv) for each edge in the MRF, determining the binary state upper bound for the selected first or second variable; and
    d) determining the single state solution for identifying content from the image data based on the determined unary potential and determined binary state upper bound for each edge.

13. The method of claim 12 further comprising the steps of:
    determining which of the first and second sets of data to continue processing based on the part upper bound values for each of the first and second sets of data;
    repeating steps b, c and d until a single state solution exists in the determined set of data; and
    outputting the single state solution.

14. The method of claim 12 further comprising the steps of:
    determining a part upper bound value for each of the first and second sets of data based on the determined unary potential and determined binary state upper bound for each edge; and
    determining which of the first and second sets of data to continue processing based on the part upper bound values for each of the first and second sets of data.

15. The method of claim 14, wherein the determination of which of the first and second sets of data to continue processing is made based on the first and second set of data that is associated with the highest part upper bound value.

16. The method of claim 12, wherein the defined splitting method comprises the steps of:
- ranking the states of each variable based on the unary potential and binary state upper bound; and
- splitting the image data based on the ranking.

17. The method of claim 16, further comprising the step of splitting the image data based on a threshold value for the determined unary potential and the determined binary state upper bound of each of the ranked states.

18. The method of claim 16, further comprising the step of splitting the image data by splitting the ranked states into two substantially equal sets where a first set of ranked states has a higher rank than a second set of ranked states.

19. A method of solving a Markov random field (MRF), the MRF having a plurality of binary potential functions representing semantic concepts in image data of a captured image, each binary potential function associated with two variables of the MRF, each of the variables representing a possible state of the semantic concept captured in the image the method comprising the steps of:
- selecting a first variable of the two variables, the first variable having more states than a second variable of the two variables, wherein each of the two variables has a plurality of states;
- for each state of the selected first variable, adding to an upper limit of the state, a maximum of a binary potential function that includes the state and the second variable, wherein the binary potential function is between a function of the first and second variables of the MRF;
- assigning to an upper limit of the first variable a maximum of the upper limit of the states of the first variable; and
- locating a solution to the MRF in a part of a solution space of the MRF using the upper limit of the first variable, where each state in the located solution is for the semantic concept of the captured image.

20. An image processing system for solving a Markov random field (MRF), the MRF having a plurality of binary potential functions representing semantic concepts in image data of a captured image, each binary potential function associated with two variables of the MRF, each of the variables representing a possible state of the semantic concept captured in the image the system comprising a processor arranged to:
- select a first variable of the two variables, the first variable having more states than a second variable of the two variables, wherein each of the two variables has a plurality of states;
- for each state of the selected first variable, add to an upper limit of the state, a maximum of a binary potential function that includes the state and the second variable, wherein the binary potential function is between a function of the first and second variables of the MRF;
- assign to an upper limit of the first variable a maximum of the upper limit of the states of the first variable; and
- locate a solution to the MRF in a part of a solution space of the MRF using the upper limit of the first variable, where each state in the located solution is for the semantic concept of the captured image.

* * * * *